(12) United States Patent
Ikuta et al.

(10) Patent No.: US 7,159,813 B2
(45) Date of Patent: Jan. 9, 2007

(54) SPOOL BRAKING DEVICE AND DUAL BEARING REEL HAVING THE SAME

(75) Inventors: Takeshi Ikuta, Sakai (JP); Ken'ichi Kawasaki, Sakai (JP)

(73) Assignee: Shimano Inc., Osaka (JP)

( * ) Notice: Subject to any disclaimer, the term of this patent is extended or adjusted under 35 U.S.C. 154(b) by 51 days.

(21) Appl. No.: 11/038,382

(22) Filed: Jan. 21, 2005

(65) Prior Publication Data

US 2005/0218255 A1 Oct. 6, 2005

(30) Foreign Application Priority Data

Feb. 2, 2004 (JP) .............................. 2004-025915

(51) Int. Cl.
*A01K 89/02* (2006.01)
(52) U.S. Cl. ...................... 242/289; 242/288
(58) Field of Classification Search ................ 242/286, 242/288, 289
See application file for complete search history.

(56) References Cited

U.S. PATENT DOCUMENTS

| 4,585,183 A | * | 4/1986 | Puryear ..................... 242/288 |
| 4,593,866 A | * | 6/1986 | Moosberg et al. .......... 242/288 |
| 4,940,194 A | * | 7/1990 | Young ......................... 242/288 |
| 6,412,722 B1 | * | 7/2002 | Kreuser et al. ............. 242/288 |
| 6,474,580 B1 | * | 11/2002 | Hirayama ................... 242/289 |
| 6,973,999 B1 | * | 12/2005 | Ikuta et al. ................. 188/161 |
| 6,983,907 B1 | * | 1/2006 | Ikuta et al. ................. 242/288 |

FOREIGN PATENT DOCUMENTS

JP 11-332436 A1 12/2005

* cited by examiner

*Primary Examiner*—Emmanuel M. Marcelo
(74) *Attorney, Agent, or Firm*—Global IP Counselors, LLP

(57) ABSTRACT

A dual bearing reel includes a reel unit having a handle and mounted on a fishing rod, a spool in which a fishing line is mounted, and a spool braking device mounted on the reel unit so as to be at least partially exchangeable with another spool braking device. The spool is rotatably mounted on the reel unit so as to be rotatable by the handle. The spool braking device includes a spool braking portion that brakes the spool according to a first predetermined braking characteristic, and a first device identification portion that indicates the first predetermined braking characteristic. The user can confirm the braking characteristic of a spool braking device when the spool braking device is exchanged with another spool braking device having a different braking characteristic.

10 Claims, 18 Drawing Sheets

SPOOL BRAKING DEVICE AND DUAL BEARING REEL HAVING THE SAME

BACKGROUND OF THE INVENTION

1. Field of the Invention

The present invention relates to a spool braking device and a dual bearing reel having a handle and such spool braking device.

2. Background Information

A spool braking device is provided in dual bearing reels, and in particular in bait casting reels that use lures and release fishing line during casting, in order to prevent backlash during casting. Spool braking devices such as a centrifugal braking device that uses centrifugal force, or a magnet braking device that uses magnetic flux generated by magnets, are known in the conventional art. In addition, a technology that electronically controls and brakes line-releasing direction rotation of a spool that is rotatively mounted to a reel unit has been recently disclosed in, for example, Japanese Laid-Open Patent Application No. H11-332436). Conventional electronically controlled braking devices include a circuit board that is arranged in the interior of the reel unit, and a plurality of electrical components that include a microcomputer and a sensor that detects the rotational speed of the spool. Such electrical components are disposed on the circuit board. In addition, a plurality of magnets are mounted to a spool shaft and are sequentially arranged in the rotational direction around the spool shaft. A coil is connected to the circuit board and disposed around the outer periphery of the magnets. Then, the spool is braked by switching the electric power generated in the coils through the rotation of the spool.

With the above-mentioned conventional braking devices, each type of braking device is characterized by different features. For example, the braking force of the magnet braking device will strengthen in proportion to the rotation of the spool. In contrast, the braking force of the centrifugal braking device will strengthen in proportion to the square of the rotation of the spool. In other words, although it is possible to change the magnitude of the braking force with these two types of braking device, it is difficult to change the characteristics of the braking force with these braking devices. Thus, it has been considered to allow the braking device to be replaced with one of different type so as to conform to the type of fishing conducted. Furthermore, in the case of an electronically controlled braking device, the characteristics of an electrically controlled braking device can be changed by exchanging it with a device having a different software. However, with either of these conventional braking devices, the fishing results will be adversely affected if the braking device is replaced with a device having the wrong braking characteristics. Therefore, it is important for a fisherman to be able to confirm which braking characteristic is being applied.

In view of the above, it will be apparent to those skilled in the art from this disclosure that there exists a need for improved spool braking devices and dual bearing reels that overcome the above-described problems of the conventional art. This invention addresses this need in the art as well as other needs, which will become apparent to those skilled in the art from this disclosure.

SUMMARY OF THE INVENTION

An object of the present invention is to provide a spool braking device and a dual bearing reel having such spool braking device that allow a user to easily confirm the braking characteristic of a spool braking device when the spool braking device is exchanged with another spool braking device having a different braking characteristic.

According to the present invention, the braking characteristics of the spool braking device can be easily confirmed because it is possible to easily identify the braking characteristic of a spool braking device when the spool braking device is exchanged with another spool braking device having different braking characteristics.

A spool braking device of a dual bearing reel according to the first aspect of the present invention is adapted to be exchangeably mounted in a dual bearing reel. The spool braking device is adapted to brake rotation of a spool. The spool braking device includes a spool braking portion that is adapted to brake the spool according to a predetermined braking characteristic; a spool control portion that is operatively coupled to the spool braking portion and configured to control the spool braking portion; and a device identification portion that indicates the predetermined braking characteristic. With this spool braking device, when the spool braking device is exchanged with one having different braking characteristics, the braking characteristic of the new spool braking device can be identified because of the device identification portion when the spool braking device is mounted on the reel unit. Therefore, when the spool brake device is to be exchanged with a spool brake device having different braking characteristics, the braking characteristics of the new spool brake device can be easily confirmed because the braking characteristic of the exchanged spool braking device can be easily identified.

The spool braking device according to the second aspect of the present invention is the spool braking device according to the first aspect of the present invention, in which the spool braking portion includes a rotor that is arranged in a rotational direction of the spool, the rotor including a plurality of magnetic poles whose polarities are sequentially different, a plurality of serially connected coils that are arranged around the circumference of the rotor, and a switch connected to both ends of the plurality of serially connected coils. The spool control portion includes a circuit board on which the plurality of coils are mounted.

The spool braking device according to the third aspect of the present invention is the spool braking device according to the second aspect of the present invention, in which the circuit board includes a program according to which the predetermined braking characteristic is determined.

A dual bearing reel according to the fourth aspect of the present invention is adapted to be mounted on a fishing rod, and includes a reel unit having a handle and adapted to be mounted on the fishing rod, a spool in which a fishing line is adapted to be mounted, the spool being rotatably mounted on the reel unit so as to be rotatable by the handle, and a first spool braking device mounted on the reel unit so as to be at least partially exchangeable. The first spool braking device includes a first spool braking portion that is adapted to brake the spool according to a first predetermined braking characteristic, and a first device identification portion that indicates the first predetermined braking characteristic.

With this dual bearing reel, when the spool braking device is exchanged with one having different braking characteristics, the exchanged spool braking device can be identified when mounted on the reel unit. Here, if the spool brake device is to be exchanged with a spool brake device having different braking characteristics, the braking characteristics of the new spool brake device can be easily confirmed because the exchanged spool braking device can be identified.

The dual bearing reel according to the fifth aspect of the present invention is the dual bearing reel according to the fourth aspect of the present invention, in which the first spool braking device includes a first spool control portion that is operatively coupled to the first spool braking portion and configured to electrically control the first spool braking portion. Here, the braking characteristics can be easily confirmed when exchanging the electrically controlled spool braking device.

The dual bearing reel according to the sixth aspect of the present invention is the dual bearing reel according to the fifth aspect of the present invention, in which the first spool control portion is configured to set a braking force with which the first spool braking portion brakes the spool in accordance with a type of the fishing line mounted on the spool. Here, the braking characteristics can be easily confirmed even when a different braking device is used in order to match with a different type of fishing line that has different weight.

The dual bearing reel according to the seventh aspect of the present invention is the dual bearing reel according to the fifth aspect of the present invention, in which the first spool braking portion includes a rotor arranged in a rotational direction of the spool the spool, the rotor including a plurality of magnetic poles whose polarities are sequentially different and rotates in association with the spool, a plurality of serially connected coils are disposed spaced apart from the rotor, and a switch connected to both ends of the plurality of serially connected coils. The first spool control portion includes a circuit board on which the plurality of coils are mounted.

In this arrangement, a lead wire that connects the coils and the circuit board will be unnecessary, and the problem of bad insulation between the coils and the circuit board can be reduced. Moreover, the coils are also mounted to the reel unit by simply installing the circuit board to the reel unit because the coils are mounted to the circuit board, which will be installed on the reel body. Because of this, the spool braking device can be assembled easily.

The dual bearing reel according to the eighth aspect of the present invention is the dual bearing reel according to the seventh aspect of the present invention, in which the circuit board includes a program according to which the predetermined braking characteristic is determined.

The dual bearing reel according to the ninth aspect of the present invention is the dual bearing reel according to the fourth aspect of the present invention, in which the first spool braking portion is configured to assume one of a plurality of braking patterns, the first spool braking device further includes a first indicator portion which allows a user to select one of the plurality of braking patterns, and the first identification portion includes a color of a surface of the first indicator portion. Here, because the spool braking device can be identified by the color of the first indicator portion that is operated from the exterior, the spool braking device can be easily identified without providing a separate identification mark. In addition, an optimal braking force can be selected in accordance with fishing conditions such as the mass of the lure and the strength and direction of the wind, because the user can select one of the plurality of control patterns.

The dual bearing reel according to the tenth aspect of the present invention is the dual bearing reel according to the fourth aspect of the present invention, further including a second spool braking device mounted on the reel unit so as to be at least partially exchangeable with the first spool braking device. The second spool braking device includes a second spool braking portion that is adapted to brake the spool according to a second predetermined braking characteristic, and a second device identification portion that indicates the second predetermined braking characteristic.

The dual bearing reel according to the eleventh aspect of the present invention is the dual bearing reel according to the tenth aspect of the present invention, in which the first and second spool braking devices are of a same type. For instance, if the first and second spool braking devices are both centrifugal braking devices, the first and second predetermined braking characteristics are due to members that are moved by the centrifugal force, and are different in weight and/or number in the first and second spool braking devices. If the first and second spool braking devices are both magnetic braking devices, the first and second predetermined braking characteristics are due to magnets that have different magnetic forces. If the first and second spool braking devices are both electrically controlled braking devices, the first and second predetermined braking characteristics are due to different control softwares. Accordingly, identification of the braking characteristics is necessary for these first and second spool devices.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration purposes only and not for the purpose of limiting the invention as defined by the appended claims and their equivalents.

Configuration of the Reel

Figure 1:
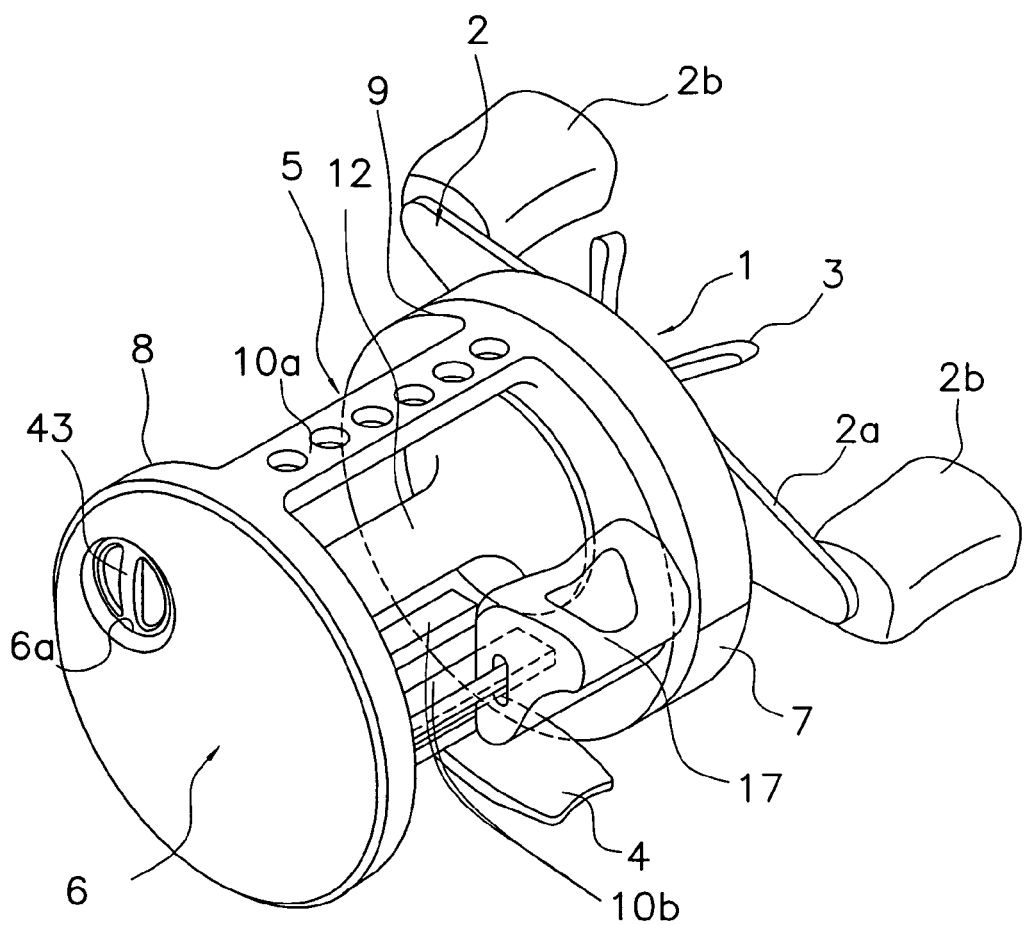
FIG. 1 is an oblique view of a dual bearing reel in accordance with an embodiment of the present invention.
Figure 2:
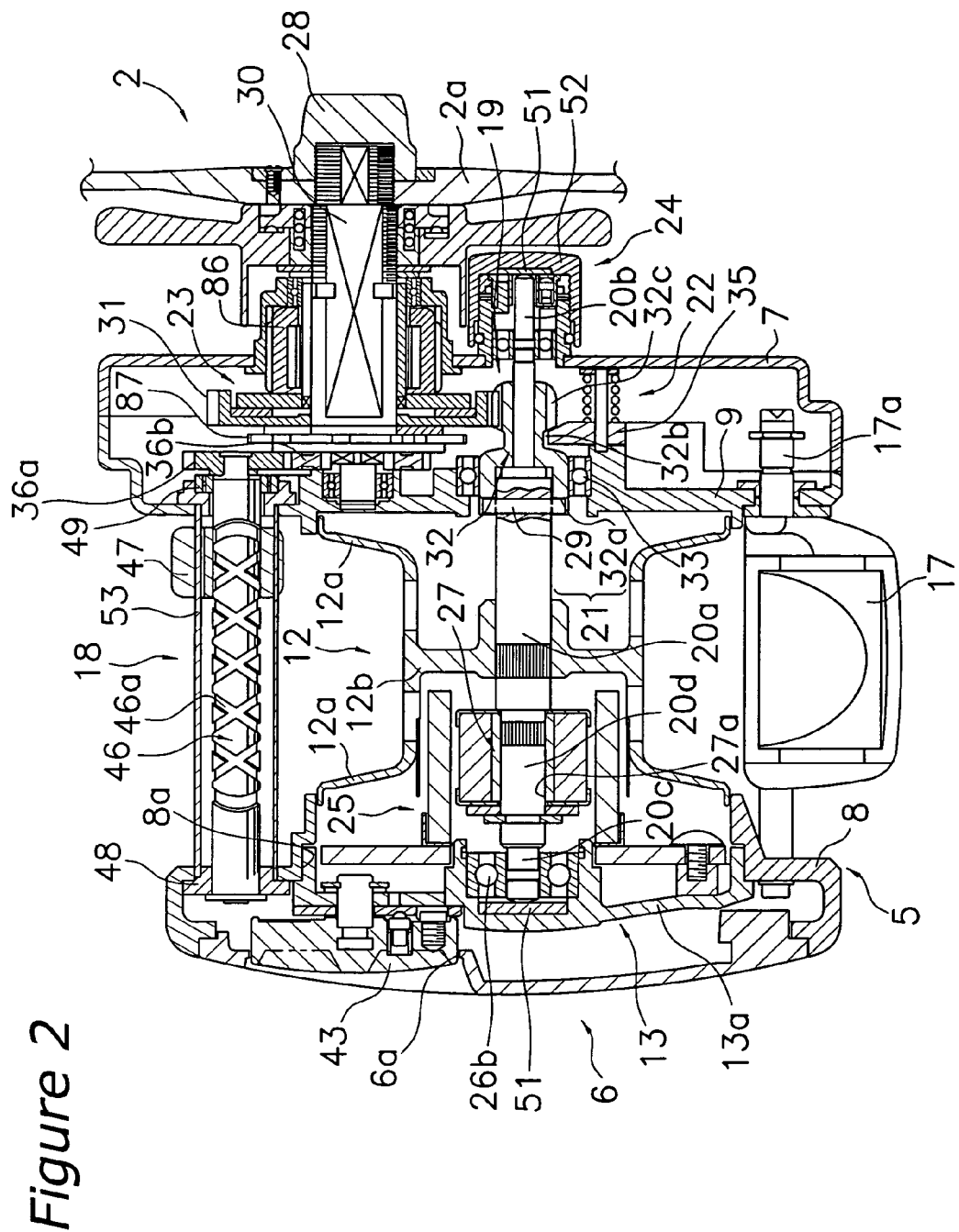
FIG. 2 is a planar cross sectional view of the dual bearing reel in accordance with the embodiment of the present invention.

In FIG. 1 and FIG. 2, a dual bearing reel according to one embodiment of the present invention is a round dual bearing reel for bait casting. This reel includes a reel unit 1, a handle 2 for rotating the spool that is disposed on the side of the reel unit 1, and a star drag 3 for adjusting drag that is disposed on the same side of the reel unit 1 as the handle 2.

The handle 2 is of the double-handle type and has a plate-shaped arm portion 2a and knobs 2b that are rotatively mounted to both ends of the arm portion 2a. As shown in FIG. 2, the arm portion 2a is non-rotatively mounted to the end of a handle shaft 30, and is fastened to the handle shaft 30 with a nut 28.

The reel unit 1 is, for example, made of a metal such as an aluminum alloy or a magnesium alloy, and includes a frame 5, and a first side cover 6 and a second side cover 7 that are mounted to both sides of the frame 5. A spool 12 for winding fishing line is rotatively mounted on a spool shaft 20 (see FIG. 2) inside the reel unit 1. When viewed from the exterior in the spool shaft direction, the first side cover 6 is circular in shape, and the second side cover 7 is formed with two disks that intersect each another.

As shown in FIG. 2, the spool 12, a clutch lever 17 and a level wind mechanism 18 are disposed inside the frame 5. The clutch lever 17 functions as a thumb rest when thumbing the fishing line, and the level wind mechanism 18 serves to uniformly wind fishing line around the spool 12. A gear mechanism 19, a clutch mechanism 21, a clutch control mechanism 22, a drag mechanism 23, and a casting control mechanism 24 are disposed in the space between the frame 5 and the second side cover 7. The gear mechanism 19 transmits rotational force from the handle 2 to the spool 12 and the level wind mechanism 18. The clutch control mechanism 22 controls the clutch mechanism 21 in accordance with the operation of the clutch lever 17. The drag mechanism 23 brakes the spool 12. The casting control mechanism 24 serves to adjust the resistance that occurs when the spool 12 rotates. In addition, an electrically controlled spool brake mechanism (an example of the spool braking device) 25 that serves to prevent backlash while casting the fishing line is disposed between the frame 5 and the first side cover 6.

The frame 5 includes a pair of side plates 8, 9 disposed such that they are disposed opposite each other across a predetermined gap, and upper and lower connectors 10a, 10b (see FIG. 1) that unitarily connect the side plates 8, 9. A circular opening 8a having a step is formed slightly above the center of the side plate 8. A spool support portion 13 that forms a portion of the reel unit 1 and the spool braking device 25 is screwed into the opening 8a.

Figure 3:
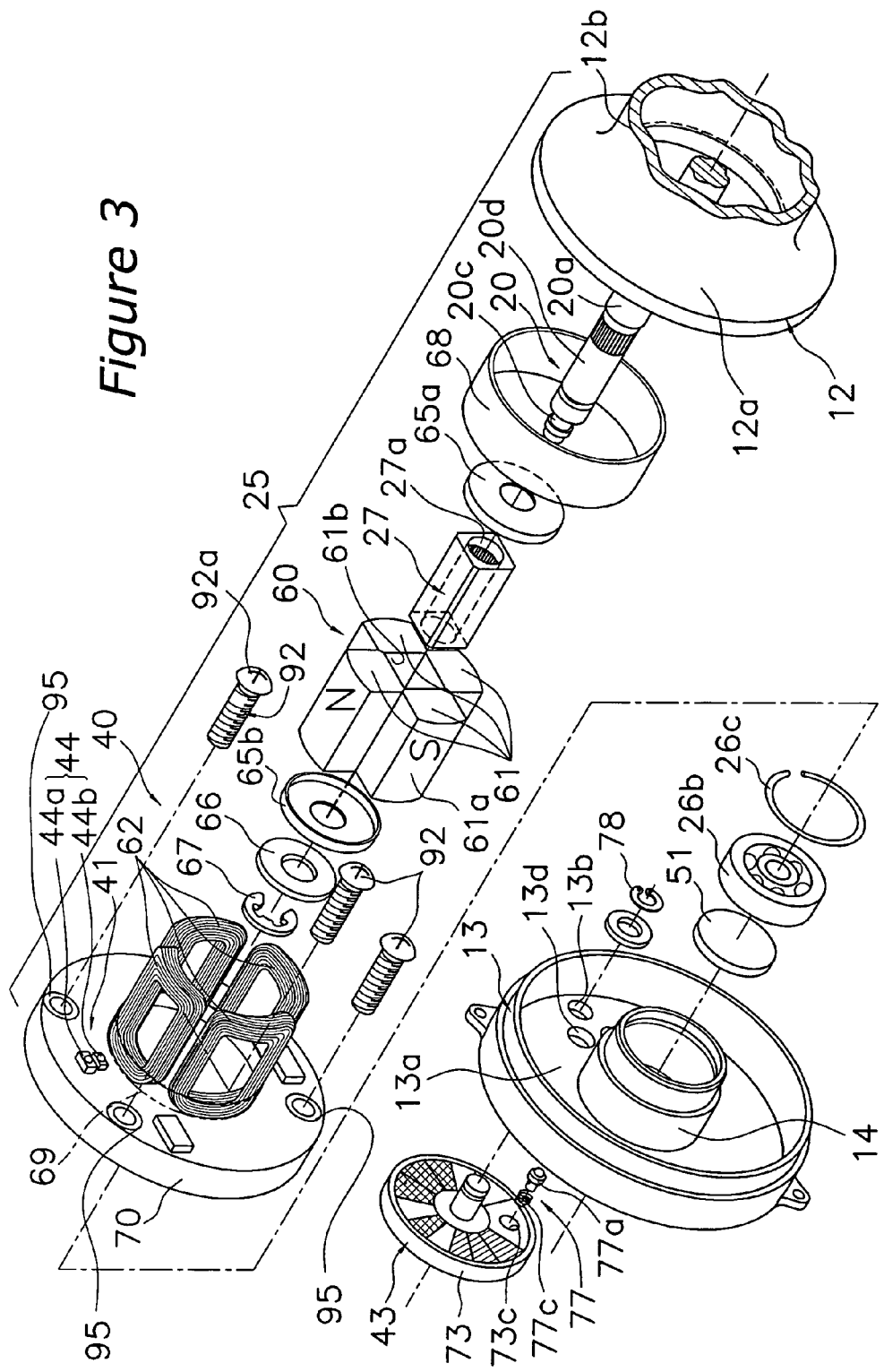
FIG. 3 is an exploded oblique view of a spool brake mechanism in the dual bearing reel in accordance with the embodiment of the present invention.
Figure 4:
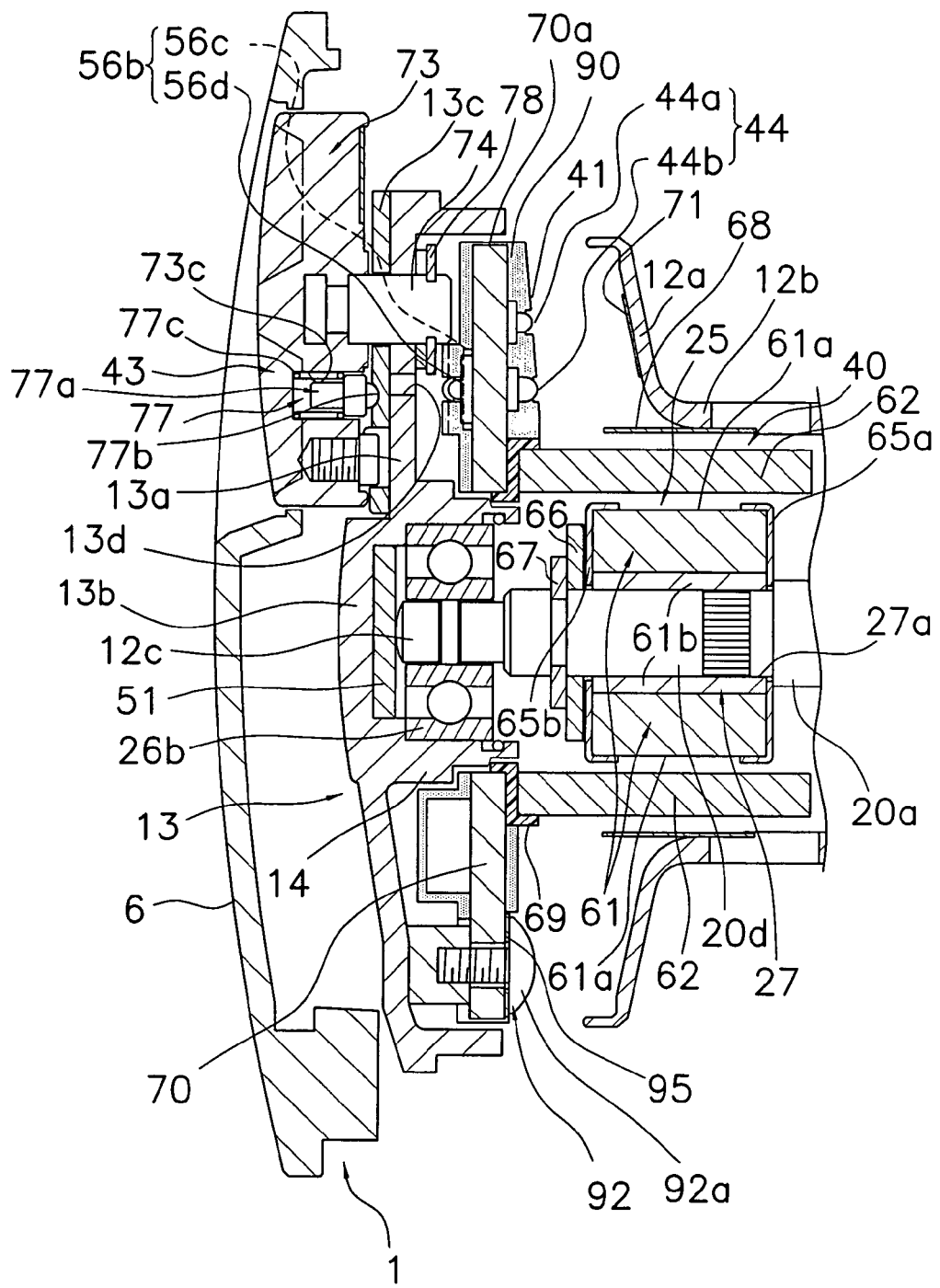
FIG. 4 is an enlarged cross-sectional view of the spool brake mechanism dual bearing reel in accordance with the embodiment of the present invention.

As shown in FIGS. 3 and 4, the spool support portion (one example of the auxiliary member) 13 is a flat and approximately closed end tubular member that is detachably mounted on the side plate 8 with, for example, three screws around the periphery of the opening 8a. A tubular bearing accommodation portion 14 that projects inward is unitarily formed in the central portion of a wall portion 13a of the spool support portion 13. A bearing 26b that serves to rotatively support one end of the spool shaft 20 is disposed on the inner peripheral surface of the bearing accommodation portion 14. In addition, a friction plate 51 of the casting control mechanism 24 is mounted on the bottom of the bearing accommodation portion 14. The bearing 26b is engaged with the bearing accommodation portion 14 via a retaining ring 26c that is made of a wire material. The spool support portion 13 as well as a portion of the spool braking device 25 and the bearing 26b is exchangeable.

As shown in FIG. 1, the upper connecting portion 10a is mounted on the same plane as the perimeter of the side plates 8, 9, and a pair of front and rear lower connecting portions 10b are disposed inwardly from the perimeter. A rod mounting leg 4 that is, for example, made of a metal such as an aluminum alloy and extends from front to rear is riveted to the lower connecting portions 10b, and serves to mount the reel to a fishing rod.

The first side cover 6 is screwed to the side plate 8 with screw members (not shown in the figures) that are inserted from the second side cover 7 side. A circular opening 6a in which a brake switch knob 43 (described below) is disposed is formed in the first side cover 6.

As shown in FIG. 2, the spool 12 has saucer-shaped flange portions 12a on both end portions thereof and a tubular bobbin 12b between the two flange portions 12a. The outer peripheral surface of the flange portion 12a on the left side of FIG. 2 is disposed so that a slight gap is open on the inner peripheral side of the opening 8a, which serves to prevent line snags. The spool 12 is non-rotatably coupled to the spool shaft 20 that passes through the inner peripheral side of bobbin 12b through, for example, a serrated coupling. The method of coupling the spool to the spool shaft 20 is not limited to this serration coupling, and other coupling methods such as key coupling or spline coupling can be employed as well.

The spool shaft 20 is made of a non-magnetic metal such as, for example, SUS 304, and passes through the side plate 9 and extends beyond the second side cover 7. The end of the spool shaft 20 that extends beyond the second side cover 7 is rotatively supported on a boss 7b mounted on the second side cover 7 with a bearing 26a. In addition, the other end of the spool shaft 20 is rotatively supported by the bearing 26b as described above. A large diameter portion 20a is formed in the center of the spool shaft 20, and small diameter portions 20b, 20c that are supported by the bearings 26a, 26b are formed on both ends of the spool shaft 20. Note that the bearings 26a, 26b are, for example made of SUS 440C that has been coated with a corrosion resistant film.

Furthermore, a magnet mounting portion 20d that serves to mount a magnet 61 (described below) is formed between the small diameter portion 20c and the large diameter portion 20a on the left side of FIG. 2, and has an outer diameter that is larger than the small diameter portion 20c and smaller than the large diameter portion 20a. A magnet retaining portion 27 is non-rotatably coupled to the magnet mounting portion 20d by serration coupling, for example. The magnetic retaining portion 27 is made of a magnetic material formed by electroless plating nickel onto the surface of an iron material such as SUM (extruded and cut). The magnet retaining portion 27 is a rectangular member having a through hole 27a formed therein and is square shaped in cross-section, and the magnet mounting member 20d passes through the center of the magnetic retaining portion 27. The method of coupling the magnet retaining member 27 to the magnet mounting portion 20d is not limited to serration coupling, and other coupling methods such as key coupling or spline coupling can be employed as well.

The right end of the large diameter portion 20a of the spool shaft 20 is disposed at a pass through portion of the side plate 9, and an engagement pin 29 that forms a part of the clutch mechanism 21 is attached at this location. The engagement pin 29 passes through the large diameter portion 20a along its diameter and projects outward from the large diameter portion 20a on both sides in the radial direction.

As shown in FIG. 2, the clutch lever 17 is disposed to the rear of the spool 12 and between the rear portions of the pair of side plates 8, 9. The clutch lever 17 slides vertically between the side plates 8, 9. An engagement shaft 17a is unitarily formed with the clutch lever 17 on the side of the clutch lever 17 where the handle is mounted, and passes through the side plate 9. The engagement shaft 17a is engaged with the clutch control mechanism 22.

As shown in FIG. 2, the level wind mechanism 18 is disposed between the two side plates 8, 9 in front of the spool 12. The level wind mechanism 18 includes a threaded shaft 46 on whose outer peripheral surface are formed intersecting helical grooves 46a, and a fishing line guide portion 47 which reciprocally moves back and forth on the threaded shaft 46 in the spool shaft direction. The two ends of the threaded shaft 46 are rotatively supported by shaft support portions 48, 49, which are mounted on the side plates 8, 9. A gear member 36a is mounted on the right end of the threaded shaft 46 in FIG. 2, and the gear member 36a meshes with a gear member 36b that is non-rotatively mounted on the handle shaft 30. With this configuration, the threaded shaft 46 rotates in association with the rotation of the handle shaft 30 in the line winding direction.

The fishing line guide portion 47 is disposed around the periphery of threaded shaft 46, and is guided in the spool shaft 20 direction by a pipe member 53 and a guide shaft (not shown in the figures). A portion of the pipe member 53 is cut away over its entire axial length, and the guide shaft is disposed above the threaded shaft 46. An engagement member (not shown in the figures) which engages with the helical grooves 46a is rotatively mounted on the fishing line guide portion 47 and reciprocally moves back and forth in the spool shaft direction due to the rotation of the threaded shaft 46.

The gear mechanism 19 includes a handle shaft 30, a main gear 31 fixedly coupled to the handle shaft 30, and a tubular pinion gear 32 that meshes with the main gear 31. The handle shaft 30 is rotatively mounted on the side plate 9 and the second side cover 7, and prohibited from rotating in the line releasing direction with a roller-type one-way clutch 86 and a ratchet-type one way clutch 87. The one touch clutch 86 is mounted between the second side cover 7 and the handle shaft 30. The main gear 31 is rotatively mounted on the handle shaft 30, and is coupled to the handle shaft 30 via the drag mechanism 23.

The pinion gear 32 extends from outside of the side plate 9 to the inside thereof, is a tubular member through which the spool shaft 20 passes, and is mounted on the spool shaft 20 so that it is moveable in the axial direction. In addition, the left side of the pinion gear 32 in FIG. 2 is rotatively and movably supported in the axial direction on the side plate 9 by a bearing 33 on the side plate 9. A meshing groove 32a that meshes with the engagement pin 29 is formed in the left end of the pinion gear 32 in FIG. 2. The meshing groove 32a and the engagement pin 29 form the clutch mechanism 21. In addition, a constricted portion 32b is formed in the central portion of the pinion gear 32, and a gear portion 32c that meshes with the main gear 31 is formed on the right end of the pinion gear 32.

The clutch control mechanism 22 includes a clutch yoke 35 that engages with the constricted portion 32b of the pinion gear 32 and moves the pinion gear 32 along the spool shaft 20 direction. In addition, the clutch control mechanism 22 also includes a clutch return mechanism (not shown in the figures) which turns the clutch mechanism 21 on when the spool 12 rotates in the line winding direction.

The casting control mechanism 24 includes a plurality of friction plates 51 and a braking cap 52. The friction plates 51 are disposed on both ends of the spool shaft 20. The braking cap 52 serves to adjust the force with which the friction plates 51 are pressed against the spool shaft 20. The left friction plate 51 is mounted inside the spool support portion 13.

Configuration of the Spool Brake Mechanism

Figure 8:
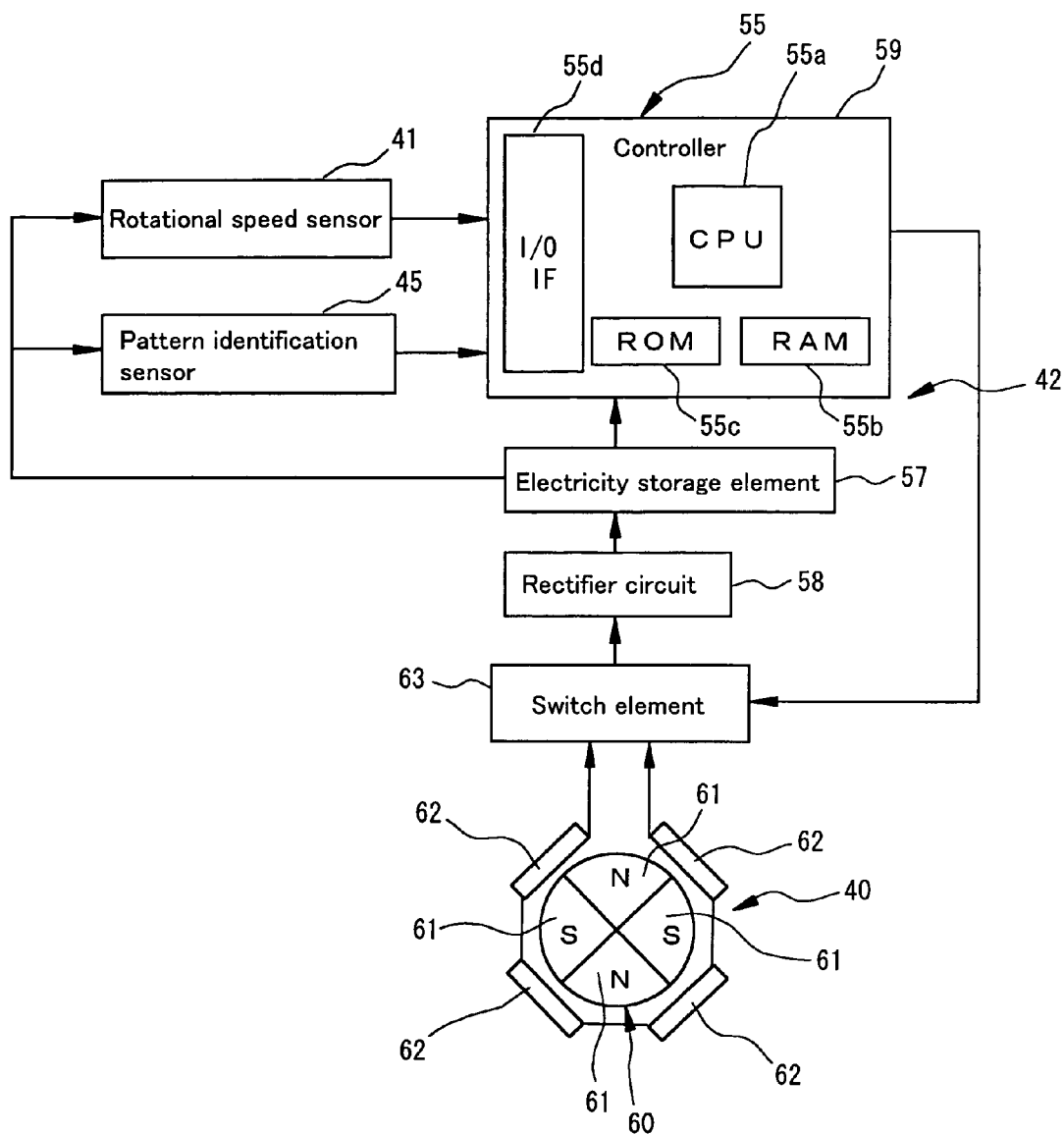
FIG. 8 is a control block diagram of the spool brake mechanism of the dual bearing reel in accordance with the embodiment of the present invention.

As shown in FIGS. 3, 4 and 8, the spool brake mechanism 25 includes a spool brake unit 40, a rotational speed sensor 41, a spool control unit 42, and the brake switch knob 43. The spool brake unit 40 is arranged between the spool 12 and the reel unit 1. The rotational speed sensor 41 serves to detect tension that is applied to the fishing line. The spool control unit 42 electrically controls the spool brake unit 40 with any one of eight braking modes, and the brake switch knob 43 serves to select the eight braking modes. The spool brake mechanism 25 together with the spool support portion 13 can be exchanged with any other spool brake mechanism having different braking characteristics. Here, the spool brake mechanism 25 having standard braking characteristics will be described below.

The spool brake unit 40 is electrically controlled to brake the spool 12 by generating electricity. The spool brake unit

40 is composed of a rotor 60 that includes 4 magnets 61 disposed around the spool shaft 20 in the rotational direction, four coils 62, for example, that are disposed opposite the outer peripheral sides of the rotor 60 and serially connected to each other, and a switch element 63 to which both ends of the plurality of serially connected coils 62 are connected. The spool brake unit 40 controls the spool 12 by turning the flow of electricity generated by the relative rotation between the magnets 61 and the coil 62 on and off with the switch element 63. The braking force generated by the spool brake unit 40 will increase in accordance with the length of time the switch element 63 is on.

The four magnets 61 of the rotor 60 are disposed side by side in the circumferential direction, and the magnets 61 are disposed such that the polarities of the magnets 61 are sequentially different. The magnets 61 have approximately the same length as that of the magnet retaining portion 27. Outer surfaces 61a of the magnets 61 are arc-shaped when viewed in cross-section, and inner surfaces 61b thereof are planar. The inner surfaces 61b are disposed so that they are in contact with the outer peripheral surfaces of the magnet retaining portion 27 of the spool shaft 20. Both ends of the magnets 61 are interposed between disk shaped and plate shaped cap members 65a, 65b that are made of a non-magnetic metal such as, for example, SUS 304. The ends of the magnets 61 are mounted to the magnet retaining portion 27 so as to be non-rotatable with respect to the spool shaft 20. Because the magnets 61 are retained by cap members 65a, 65b that are made from a non-magnetic metal, assembly of the magnets 61 onto the spool shaft 20 can be performed easily without having to weaken the magnetic force of the magnets 61. Also, it is possible to increase the comparative strength of the magnets 61 after assembly.

The distance between the left end surface of the magnets 61 in FIG. 4 and the bearing 26b is 2.5 mm or greater. The cap member 65a on the right side of FIG. 4 is interposed between the magnet retaining portion 27 and the step between the large diameter portion 20a and the magnet mounting portion 20d of the spool shaft 20. In this manner, it is possible to limit rightward movements of the cap member 65a.

A washer member 66 is mounted to the left side of the cap member 65b and disposed between the cap member 65b and the bearing 26b. The washer member 66 is made from a magnetic material formed by electroless nickel plating the surface of an iron material such as SPCC (plate). The washer member 66 is retained by, for example, an e-shaped retaining ring 67 that is mounted to the spool shaft 20. The washer member 66 has a thickness between 0.5 mm and 2 mm, and the outer diameter thereof is between 60% and 120% of the outer diameter of the bearing 26b. It will be difficult for the bearing 26b disposed near the magnets 61 to become magnetized due to the arrangement of the magnetic washer 66. Because of this, it will be difficult for the magnets 61 to have an impact on the ability of the spool 12 to rotate when the spool 12 is freely rotating, even if the magnets 61 are disposed nearby the bearing 26b. In addition, it will also be difficult for the bearing 26b to become magnetized because the distance between the magnets 61 and the bearing 26b is 2.5 mm or greater, which is a sufficient distance to prevent the bearing 26b from being magnetized.

A sleeve 68 is mounted on the inner peripheral surface of the bobbin 12b in a position that faces the magnets 61, and is made from a magnetic material formed by electroless nickel plating the surface of an iron material such as SUM (extruded and cut material). The sleeve 68 is fixedly attached to the inner peripheral surface of the bobbin 12b by a suitable attaching method such as press fitting or adhesive. When this type of magnetic sleeve 68 is disposed opposite the magnets 61, electrical generation and brake efficiency are increased because magnetic flux from the magnets 61 converge on and pass through the coils 62.

The coils 62 are of a coreless type, and serve to prevent cogging and make the rotation of the spool 12 smooth. Furthermore, a yoke is not provided. The coils 62 are wound into approximate rectangular shapes so that the wrapped core wires face the magnets 61 and are disposed inside the magnetic fields of the magnets 61. The four coils 62 are serially connected, and both ends thereof are connected to the switch element 63. The coils 62 are curved so as to extend along the rotational direction of the spool 12 into arc-shapes that are substantially concentric with respect to the spool shaft so that the distance between the outer surfaces 61a of the magnets 61 and the coils 62 is approximately uniform. Because of this, the gap between the coils 62 and the magnets 61 during rotation can be uniformly maintained. The four coils 62 are, for example, held in place by a disk shaped and plate shaped coil holder 69 that includes a brim made of a synthetic resin. The surface of the coils 62 are covered by an insulating film such as a varnish or the like. The coil holder 69 is fixedly coupled to a circuit board 70 (described below) that forms the spool control unit 42. Note that in FIG. 3, the coil holder 69 is illustrated with dashed lines in order to show the coils 62. Thus, the four coils 62 are easily mounted to the circuit board 70 because the coils 62 are mounted on the coil holder 69 made of a synthetic resin, and the magnetic flux from the magnets 61 will not be disturbed because the coil holder 69 is made from a synthetic resin.

Figure 5A:
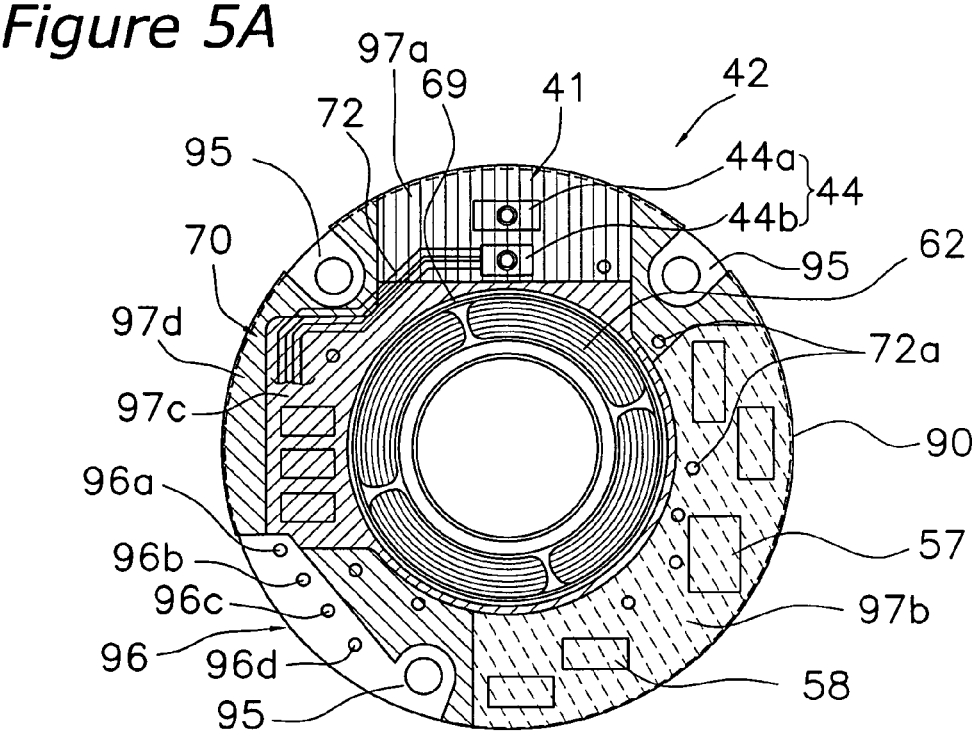
FIG. 5A is a plan view showing the disposition of components on a circuit board of the spool brake mechanism in the dual bearing reel in accordance with the embodiment of the present invention.
Figure 5B:
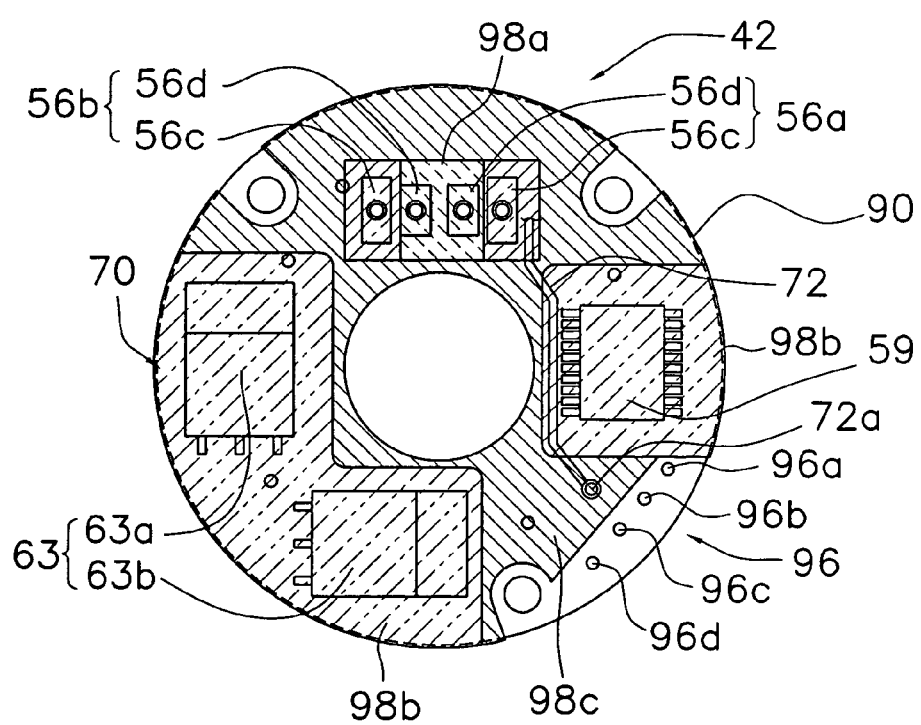
FIG. 5B is a rear plan view showing the disposition of components on the circuit board of the spool brake mechanism in the dual bearing reel in accordance with the embodiment of the present invention.

The switch element 63 includes, for example, two parallel connected FET (field effect transistors) 63a that can switch on and off at a high speed. The serially connected coils 62 are connected to each drain terminal of the FET 63a. As shown in FIG. 5B, the switch element 63 is mounted to the rear surface of the circuit board 70 (the surface, which is the opposite side of the surface that faces the flange portions 12a.

The rotational speed sensor 41 employs, for example, a reflection type electro-optical sensor 44 that includes a light emitting portion 44a and a receptor portion 44b, and is disposed on the front surface of the circuit board 70 that faces the flange portions 12a of the spool 12. A read-out pattern 71 is formed on the outer side surface of the flange portion 12a with a suitable method such as printing, applying a sticker, or attaching a reflective plate. The read-out pattern 71 serves to reflect light illuminated from the light portion 44a. Signals from the receptor portion 44b of the rotational speed sensor 41 allow the rotational speed of the spool 12 to be detected so that tension can be applied to the fishing line.

Figure 6A:
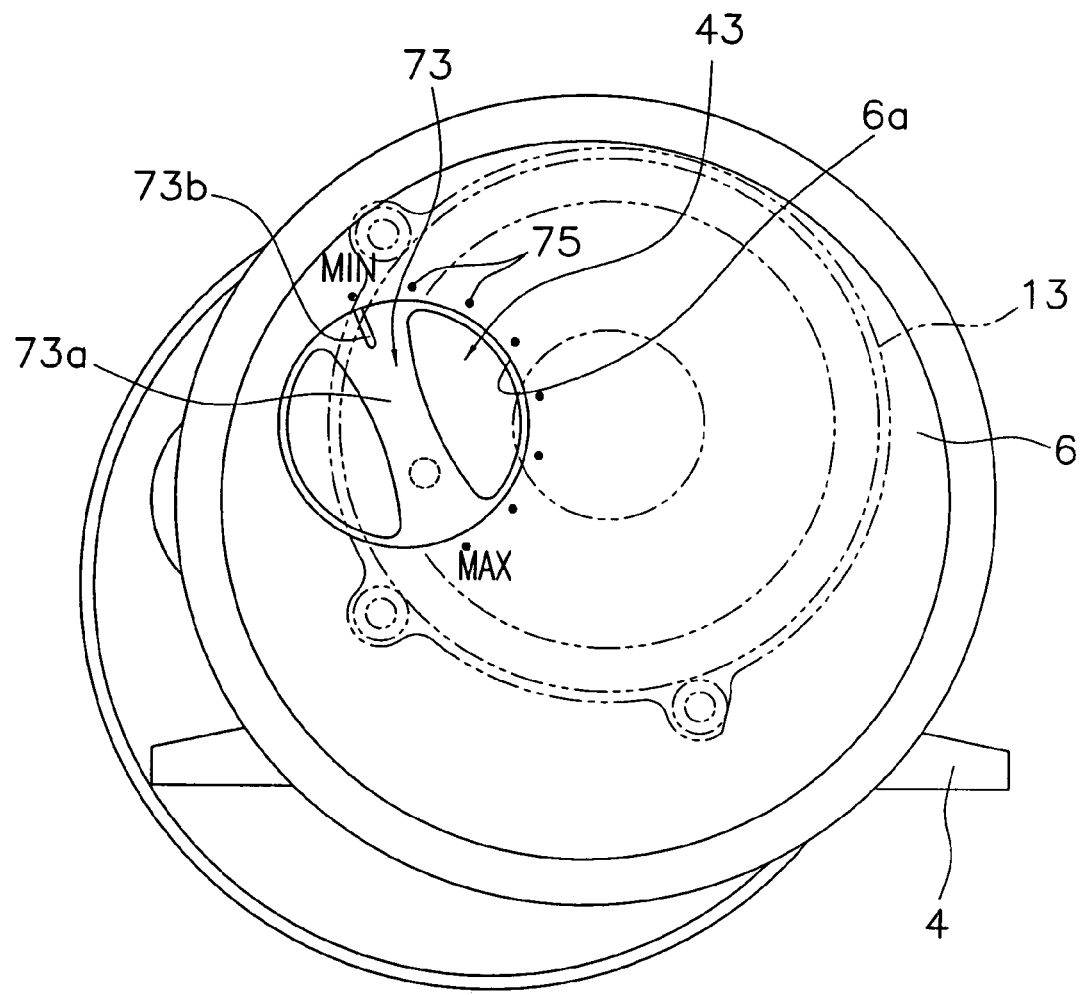
FIG. 6A is a right lateral view of the dual bearing reel dual bearing reel in accordance with the embodiment of the present invention.
Figure 6B:
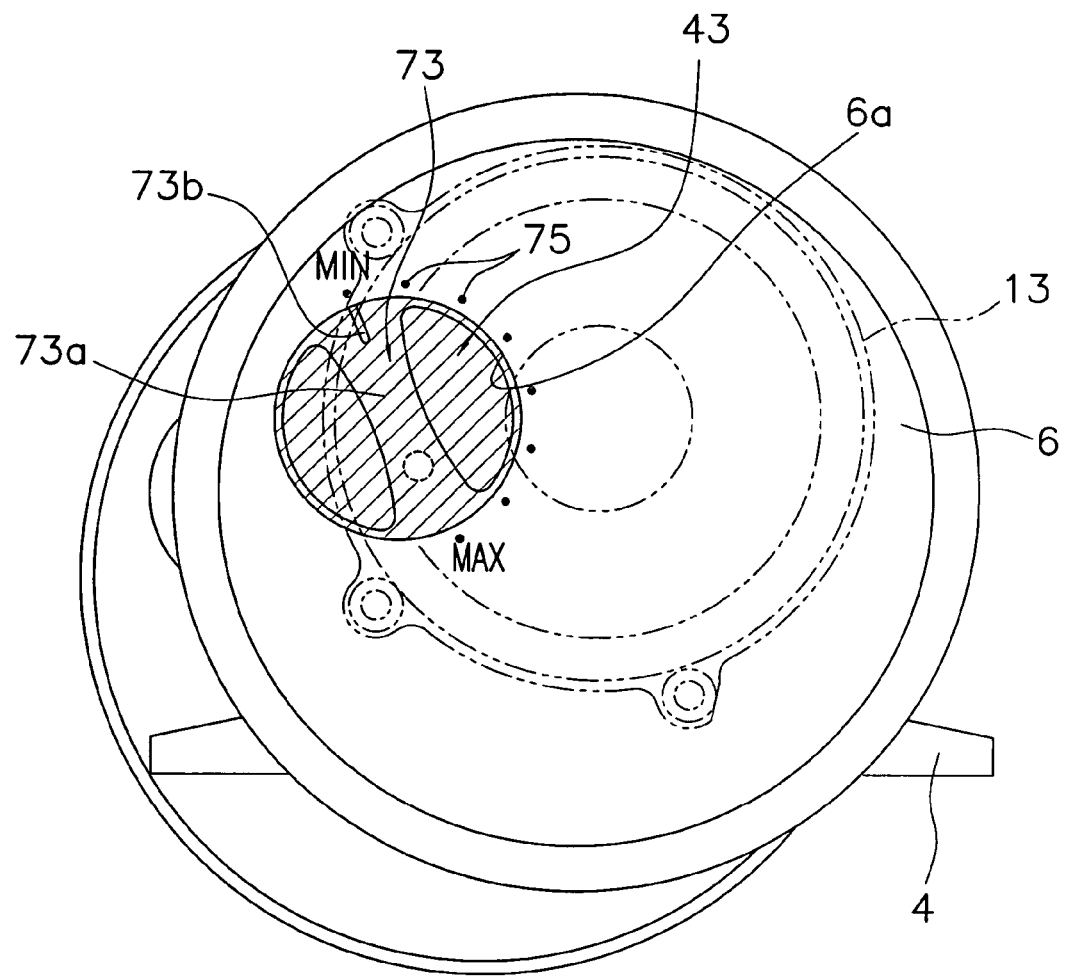
FIG. 6B is a right lateral view of the dual bearing reel dual bearing reel in accordance with the embodiment of the present invention, with another spool braking device mounted thereon.
Figure 7:
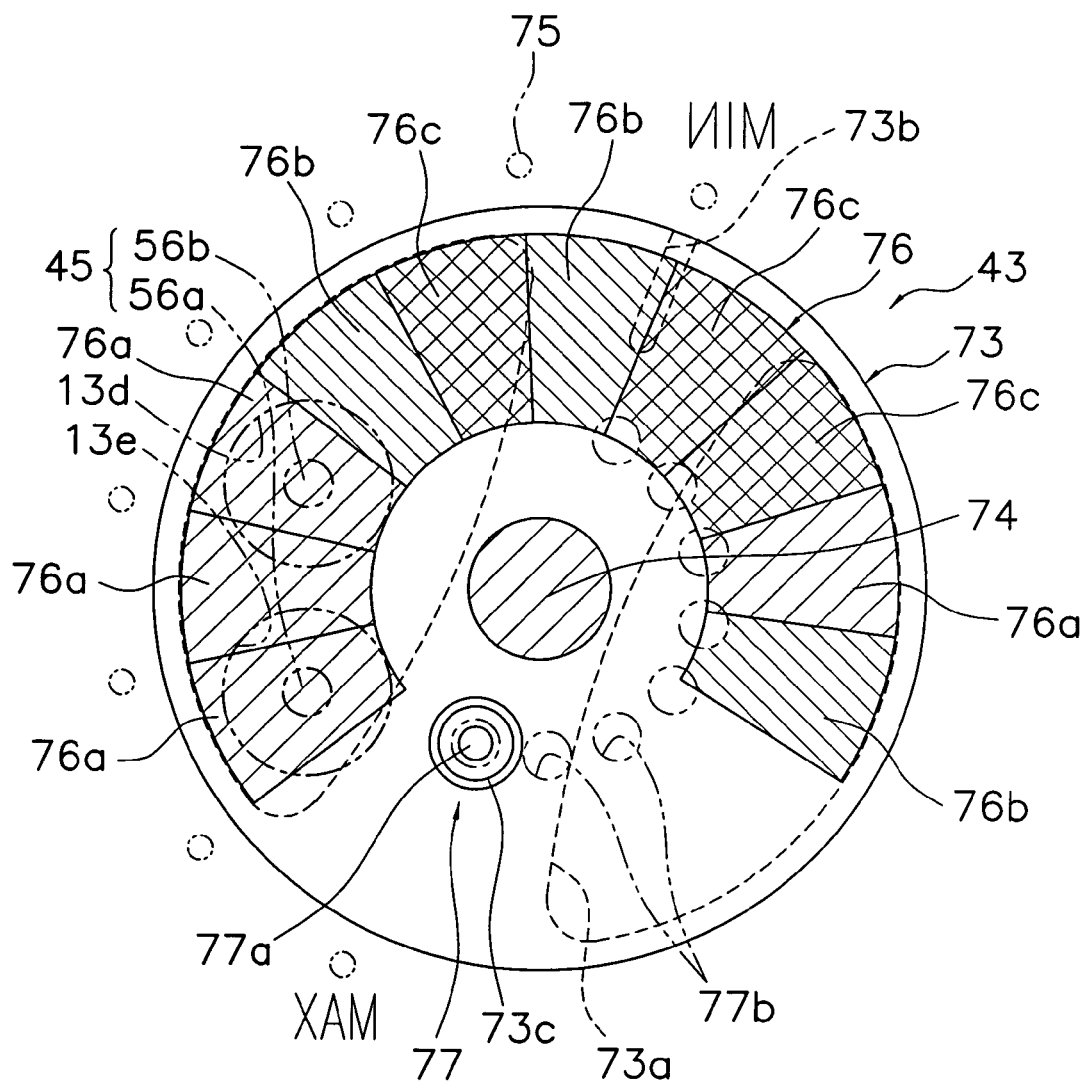
FIG. 7 is a rear plan view of a brake switch knob of the spool brake mechanism in the dual bearing reel in accordance with the embodiment of the present invention.

The brake switch knob 43 is provided so that the braking mode can be set to any one of 8 levels. As shown in FIGS. 4, 6 and 7, the brake switch knob 43 is rotatively mounted to the spool support portion 13. The brake switch knob 43 includes, for example, a disk-shaped knob unit 73 that is made of a synthetic resin, and a rotation shaft 74 that is made of metal and positioned in the center of the knob unit 73. The rotation shaft 74 and the knob unit 73 are unitarily formed by insert molding. A knob portion 73a that extends outward is formed on the outer surface of the knob unit 73 that is exposed in the opening 6a. The perimeter of the knob portion 73a is concave in shape, which makes the brake switch knob 43 easy to operate. In addition, the color of the exposed surface on the exterior of the knob unit 73 formed by the knob portion 73a is color-coded in accordance with the braking characteristics of the spool brake mechanism 25. For example, the color of the surface of the knob unit 73 on the spool brake mechanism 25 having standard braking characteristics is the same color (e.g., silver) as that of the first cover 6. However, a knob unit 73' of a spool brake mechanism 25' that has different braking characteristics from the standard braking characteristics has a color such as gold, which is different from the color of the knob unit surface. Thus, it can be easily distinguished from the spool brake mechanism 25 having standard braking characteristics.

An indicator 73b is formed in one end of the knob portion 73a and is slightly concave. 8 marks 75 that face the indicator 73b are formed with a uniform spacing around the perimeter of the opening 6a in the first cover 6 by a suitable method such as printing or affixing a sticker. Any braking mode can be selected and set by rotating the brake switch knob such that the indicator 73b points to one of the marks 75. In addition, an identification pattern 76 is formed with a uniform spacing on the back surface of the knob unit 73 by a suitable method such as printing or affixing a sticker, and serves to detect the rotational position of the brake switch knob 43, i.e., which of any of the braking modes has been selected. The identification pattern 76 includes three types of 10 fan-shaped first to third patterns 76a, 76b, and 76c in the rotational direction. The first pattern 76a is illustrated with hatching on the lower left portion of FIG. 7, and is for example a mirrored surface that reflects light. The second pattern 76b is illustrated with hatching on the lower right portion of FIG. 7, and is for example a pattern that is black and thus reflects light with difficulty. The third pattern 76c is illustrated with cross-hatching in FIG. 7, and is for example a gray pattern that reflects only approximately half of the light. Which of any of the 8 levels of braking mode have been selected can be identified by the combination of these three types of patterns 76a–76c. Note that if one of the patterns 76a–76c is the same color as the knob unit 73, then the back surface of the knob unit 73 may be used as is and a separate pattern need not be formed thereon.

The rotation shaft 74 is mounted in a through hole 13b formed in the wall portion 13a of the spool support portion 13, and is engaged with the wall portion 13a by a retaining ring 78.

A positioning mechanism 77 is provided between the knob unit 73 and the outer surface of the wall portion 13a of the spool support portion 13. The positioning mechanism 77 positions the brake switch knob 43 at a positions of the 8 levels that correspond to the braking mode, and generates sounds when the brake switch knob 43 is rotated. The positioning mechanism 77 includes a positioning pin 77a, eight positioning holes 77b, and an urging member 77c. The positioning pin 77a is mounted in a recessed portion 73c formed in the back surface of the knob unit 73. The positioning holes 77b engage with the tip of the positioning pin 77a. The urging member 77c urges the positioning pin 77a toward the positioning holes 77b. The positioning pin 77a is a rod shaped member that includes a small diameter head portion, a brim portion having a diameter that is larger than the head portion, and a small diameter shaft portion. The head portion is formed into a hemispherical shape. The positioning pin 77a is mounted in the recessed portion 73c so that it can both project outward and retract inward. The eight positioning holes 77b are formed in a spaced relationship in the circumferential direction in a fan-shaped auxiliary member 13c that is fixedly attached around the periphery of the through hole 13b in the outer surface of the wall portion 13a of the spool support portion 13. The positioning holes 77b are formed so that the indicator 73b will align with any of the eight marks 75.

The spool control unit 42 includes the circuit board 70 that is mounted to the outer wall surface of the spool support portion 13 that faces the flange portion 12a of the spool 12, and a controller 55 that is provided on the circuit board 70.

The circuit board 70 is a washer-shaped and ring-shaped substrate having a circular opening in the center thereof, and is disposed on the outer peripheral side of the bearing accommodation portion 14 such that it is substantially concentric with the spool shaft 20. As shown in FIGS. 5A and 5B, the circuit board 70 includes printed circuits 72 both on the front surface on which the coils 62 are mounted and on the rear surface thereof. Note that only a portion of the printed circuits 72 are shown in FIGS. 5A and 5B. Portions of the printed circuits 72 on the front and rear surfaces of the circuit board 70 are electrically connected to each other through through holes 72a. An external equipment connector 96 is formed on the outer peripheral side of the circuit board 70, which for example serves to connect an inspection device (an example of external equipment) that inspects whether or not the electronic circuit is operating normally. Four connection points 96a–96d that can electrically connect to the inspection device are formed in the external equipment connector 96.

The circuit board 70 is fixedly coupled to the inner side surface of the wall portion 13a of the spool support portion 13 with three screws 92. When the circuit board 70 is to be coupled with the screws 92, then for example a jig that is temporarily positioned on the bearing accommodation portion 14 is used to center the circuit board 70, and the circuit board 70 is then disposed so that it is substantially concentric with respect to the spool shaft 20. In this way, when the circuit board 70 is mounted to the spool support portion 13, the coils 62 fixed attached to the circuit board 70 will be disposed so that they are substantially concentric with the spool shaft axis.

Here, the dimensions of the reel unit 1 in the spool shaft direction can be made smaller than when the circuit board 70 is mounted in a space between the reel unit 1 and the first side cover 6 because the circuit board 70 is mounted to the opened outer wall surface of the spool support portion 13 that forms the reel unit 1. This allows the overall size of the reel unit 1 to be reduced. In addition, because the circuit board 70 is mounted on a surface of the spool support portion 13 that faces the flange portion 12a of the spool 12. Therefore, the coils 62 mounted around the periphery of the rotor 60 can be directly attached to the circuit board 70. Because of this, a lead wire that connects the coils 62 and the circuit board 70 will be unnecessary, and the problem of insufficient insulation between the coils 62 and the circuit board 70 can be reduced. Moreover, because the coils 62 are mounted to the circuit board 70 attached to the spool shaft portion 13, the coils 62 can be mounted to the spool support portion 13 by only attaching the circuit board 70 to the spool support portion 13. Because of this, the spool brake mechanism 25 can be easily assembled.

The controller 55 is for example composed of a microcomputer disposed on the circuit board 70 and provided with a CPU 55a, a RAM 55b, a ROM 55c and an I/O interface 55d. A control program is stored in the ROM 55c of the controller 55, as well as brake patterns that execute three brake processes (described below) in accordance with each of the eight levels of braking mode. In addition, predetermine values for tension and rotational speed during each braking mode are also stored in the ROM 55c. The rotational speed sensor 41 that detects the rotational speed of the spool 12, and a pattern identification sensor 45 for detecting the rotational position of the brake switch knob 43, are operatively connected to the controller 55. In addition, the gates of each FED 63a of the switch element 63 are operatively connected to the controller 55. The controller 55 controls the on/off state of the switch element 63 of the spool brake unit 40 in response to pulse signals from each sensor 41, 45, using PWM (pulse width modulated) signals having cycles of, for example, ¹⁄₁₀₀₀ seconds that are generated by the control program (described below). More specifically, the controller 55 controls the on/off state of the switch element 63 in the 8 levels of braking mode with different duty ratios D. Electric power is supplied to the controller 55 from an condenser element 57. This electric power is also supplied to the rotational speed sensor 41 and the pattern identification sensor 45.

The pattern identification sensor 45 is provided in order to read out the three types of patterns 76a–76c of the identification pattern 76 formed on the back surface of the knob unit 73 of the brake switch knob 43. The pattern identification sensor 45 is composed of two electro-optical sensors 56a, 56b each having a light emitting portion 56c and a receptor portion 56d. As shown in FIG. 5B, the electro-optical sensors 56a, 56b are symmetrically disposed on the circuit board 70 such that they are aligned on the rear surface of the circuit board 70 that faces the wall portion 13a of the spool support portion 13. In other words, the receptor portions 56d of the electro-optical sensors 56a, 56b are aligned with each other, and the light emitting portions 56c thereof are disposed on the outer sides of the aligned receptor portions 56d. Thus, the receptor portions 56d can be disposed separate from each other. Thus, it is difficult for light from the opposite light emitting portion 56c to be erroneously detected by the receptor portions 56d. Viewing holes 13d, 13e are formed in the wall portion 13a of the spool support portion 13 such that they are vertically aligned, and allow the electro-optical sensors 56a, 56b to acquire each pattern 76a–76c. Here, the eight levels of braking mode can be identified as will be described below by reading out the three types of patterns 76a–76c disposed such that they are aligned in the rotational direction.

As shown in FIG. 7, when the indicator 73b is in the weakest position, the pattern identification sensor 45 will read out reflected light from two of the first patterns 76a. In this state, both electro-optical sensors 56a, 56b will detect the largest amount of light. Then, if the selector 73b is aligned with the next mark, the electro-optical sensor 56b on the left side of FIG. 5B will be positioned on the first pattern 76a and detect a strong amount of light, but the electro-optical sensor 56a on the right side will be positioned on the second pattern 76b and detect almost no light. The position of the brake switch knob 43 will be identified by combining these detected light amounts.

The condenser element 57 employs, for example, an electrolytic condenser, and is connected to a rectifier circuit 58. The rectifier circuit 58 is connected to the switch element 63, and both converts alternating current from the spool brake unit 40 to direct current (the spool brake unit 40 has the rotor 60 and coils 62 and functions as an electric generator) and stabilizes the voltage to be supplied to the condenser element 57.

Note that the rectifier circuit 58 and the condenser element 57 are both provided on the circuit board 70. As shown by the dots in FIGS. 4 and 5, both the circuit board 70 and the electrical components (such as the microcomputer 59) mounted on both sides of the circuit board 70 are covered with a molded insulating coating film 90 made from a synthetic resin insulating material that is colored so that light will only partially pass through the molded insulating coating film 90. As shown in FIG. 4, the molded insulating coating film 90 is formed not only on the upper and lower surfaces of the circuit board 70, but also formed on the edge portion 70a at a thickness that is thinner than that of the other portions (e.g., a thickness from 0.2 mm to 0.6 mm). Thus, by forming an insulating coating film on the edge portion 70a having a thickness that is thinner than that of the other portions, the edge portion 70a of the circuit board 70 can prevent delamination of the molded insulating coating film 90 without taking up too much space. In addition, the intrusion of liquid from the edge portion 70a of the circuit board 70 to the interior of the circuit board 70 can be prevented.

The insulating coating film 90 is formed by a known process such as a hot melt molding process, in which a resin raw material is injected into a mold 101 (FIG. 13) in which the circuit board 70 having electrical components such as the microcomputer 59 and electro-optical sensors 44, 45a, 56b is set. However, the insulating coating film 90 is not formed on the front and rear sides of regions 95 on which head portions 92a of the screws 92 are disposed, or on the light emitting portions of the lights 44a, 56c and receptor portions of the receptors 44b, 56d of the electro-optical sensors 44, 55a, 56b. In addition, the molded insulating coating film 90 is not formed on a region on which an external device connector 96 is formed. The molded insulating coating film 90 is not formed on a region on which an external device connector 96 is formed in order to eliminate the task of removing the molded insulating coating film 90 when using the connecting point 96a–96d on the external device connector 96 to inspect whether or not the circuit is in a normal condition during the manufacture of the circuit board 70. Note that when the inspection of the circuit is completed, an insulating coating film 90 is additionally formed by a known process, for example a hot melt spray process, on the region on which the external device connector 96 is formed.

As shown in FIG. 5A, different thicknesses of the insulating film 90 are formed on four regions on the surface of the circuit board 70, the four regions including an inclined first region 97a on which the electro-optical sensors 44 are disposed, a second region 97b that has, for example, a thickness of approximately 3.3 mm and on which the condenser element 57 and the rectifier circuit 58 are disposed, a third region 97c that has, for example, a thickness of approximately 2.5 mm around the periphery of the coils 62, and a fourth region 97d that has a thickness of, for example, approximately 1 mm.

Figure 14:
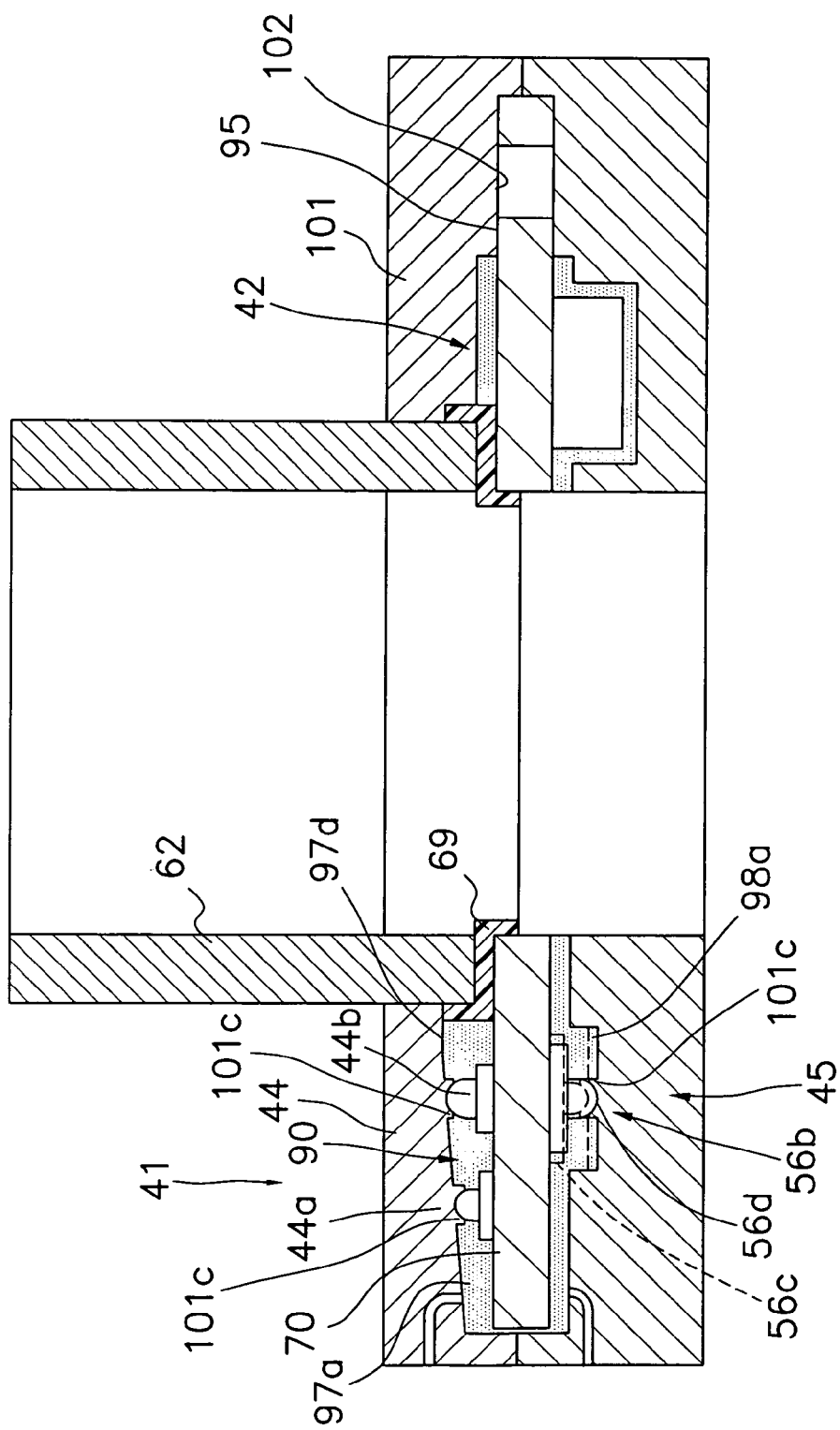
FIG. 14 is a cross sectional view showing the structure of a mold of the spool brake mechanism in accordance with the embodiment of the present invention.

In the first region 97a in which a light emitting portion of the light emitting portion 44a and a receptor portions of the receptor 44b of the electro-optical sensor 44 are disposed, as shown in FIGS. 4 and 14, the molded insulating coating film 90 is formed such that it is inclined from the third region 97c toward the outer peripheral edge of the circuit board 70 so that the light emitting portion 44a and the receptor 44b are bundled together.

As shown in FIG. 5B, on the rear surface of the circuit board 70, different thicknesses of the insulating film 90 are formed on four regions, the four regions including an inclined first region 98a that has, for example, thicknesses of approximately 2.2 mm and approximately 1.8 mm and on which the two electro-optical sensors 56a, 56b are disposed, a second region 98b that is divided into two portions has, for example, a thickness of approximately 2.8 mm, and on which the microcomputer 59 and the switch element 63 are disposed, and a third region 98c that has a thickness of, for example, approximately 1 mm.

With the light emitting portions of the lights 56c and the receptor portions of the receptors 56d of the electro-optical sensors 56a, 56b, the molded insulating film 90 is formed such that the thickness of the molded insulating coating film 90 in the first region 98a is different in the light emitting portions 56c and in the receptors 56d. The thickness around the light emitting portions 56c is approximately 2.2 mm, while the thickness around the receptors 56d is, for example, approximately 1.8 mm. The molded insulating film 90 is also formed such that the first region 98a projects from the third region 98c in a direction away from the circuit board 70 so that the two sensors 56a, 56b are bundled together. Thus, by bundling the light emitting portions and the receptors 44a, 56c, 44b, 56d and the two optical sensors 56a, 56b together, the shape of mold 101 that forms the molded insulating coating film 90 is formed such that the molded insulating coating film 90 covers the electrical components such as the light emitting portions 44a, 56c, the receptors 44b, 56d, the microcomputer 59 and the switch element 63, can be simplified, and molding costs can be reduced.

Furthermore, the molded insulating coating film 90 is formed on the first regions 97a, 98a so that the molded insulating coating film 90 surrounds the peripheries of the light emitting portions 44a, 56c and the receptors 44b, 56d in tubular shapes, and that the tops of the molded insulating coating film 90 are open. A portion of the molded insulating coating film 90 that surrounds the light emitting portions and the receptor portions of the light emitting portions and receptors 44a, 56c, 44b, 56d in tubular shapes function as a light shield with respect to other light emitting portions and receptors.

A water-repelling layer is formed on the inner circumferential surface of the tubular portions of the molded insulating coating film 90 and on the lights and receptor portions by, for example, spraying water repellant thereon. Thus, it will be difficult for moisture to remain because the light emitting portions and receptor portions are surrounded with tubular shapes, even if moisture adheres to the inner peripheral surfaces of the tubular portions. Thus, contamination caused by the deposit of impurities contained in moisture can be controlled, and declines in the efficiency of the light emitting portions and the receptor portions of the light emitting portions and receptors caused by such contamination can be controlled.

The reason why the insulating coating film 90 is not formed on the regions 95 on which the head portions 92a of the screws 92 are to be disposed is because if the insulating coating film 90 is formed on the regions 95 on which the head portions 92a of the screws 92 are disposed, the insulating coating film 90 will delaminate due to contact between the heat portions 92a and the insulating coating film 90 when the screws 92 are screwed into the circuit board 70, and this delamination may spread to the entire circuit board 70. On the other hand, if the regions 95 on which the head portions 92a of the screws 92 are disposed are not covered with the insulating coating film 90, the head portions 92a will not come into contact with the insulating coating film 90 when the screws 92 are screwed into the circuit board 70. Accordingly, the insulating coating film 90 will not delaminate, and it will be difficult for bad insulation due to delamination to occur.

In addition, if the insulating coating film 90 covers the light emitting portion of the light emitting portions 44a, 56c and the receptor portions of the receptors 44b, 56d of the electro-optical sensors 44, 55a, 56b, the amount of light that is emitted from the light emitting portions 44a, 56c, the amount of light reflected from the read-out pattern 76 and the identification patter, and the amount of light received by the receptors 44b, 56d will be reduced, and thus the light may not be correctly detected by the receptors 44b, 56d, even if these components are covered with a transparent insulating coating film.

However, in the present embodiment, a reduction in the light that radiates from the light emitting portions 44a, 56c and is reflected by the patterns 76 can be prevented because the light emitting portions 44a, 56c and the receptors 44b, 56d are not covered by the insulating coating film 90. Because of this, it will be difficult for operational errors in the electro-optical sensors 44, 56a, 56b to occur due to a fading of light received by the receptors 44b, 56d, or the wrong light being received by the receptors 44b, 56d. In addition, the peripheries of the light emitting portions 44a, 56c and receptors 44b, 56d are shielded with the insulating coating film 90 that ms made of a colored synthetic resin, which is difficult for light to pass through. Furthermore, the insulating coating film 90 is formed in a tubular shape so that the insulating coating film 90 surrounds the peripheries of the lights 44a, 56c and the receptors 44b, 56d of the electro-optical sensors 44, 56a, 56b with the tops of the tubular shapes being open. Thus, it will be difficult for the light emitting portions 44a, 56c and the receptors 44b, 56d to emit light to or receive light from the surrounding areas. Therefore, even though the light emitting portions 44a, 56c and the receptors 44b, 56d are disposed close to each other, it will be difficult for light to be emitted directly from the lights 44a, 56c to the receptors 44b, 56d. Thus operational errors can be prevented.

The steps of forming the molded insulating coating film 90 so that it covers the circuit board 70 will be described by referring to FIGS. 13–15.

Figure 13:
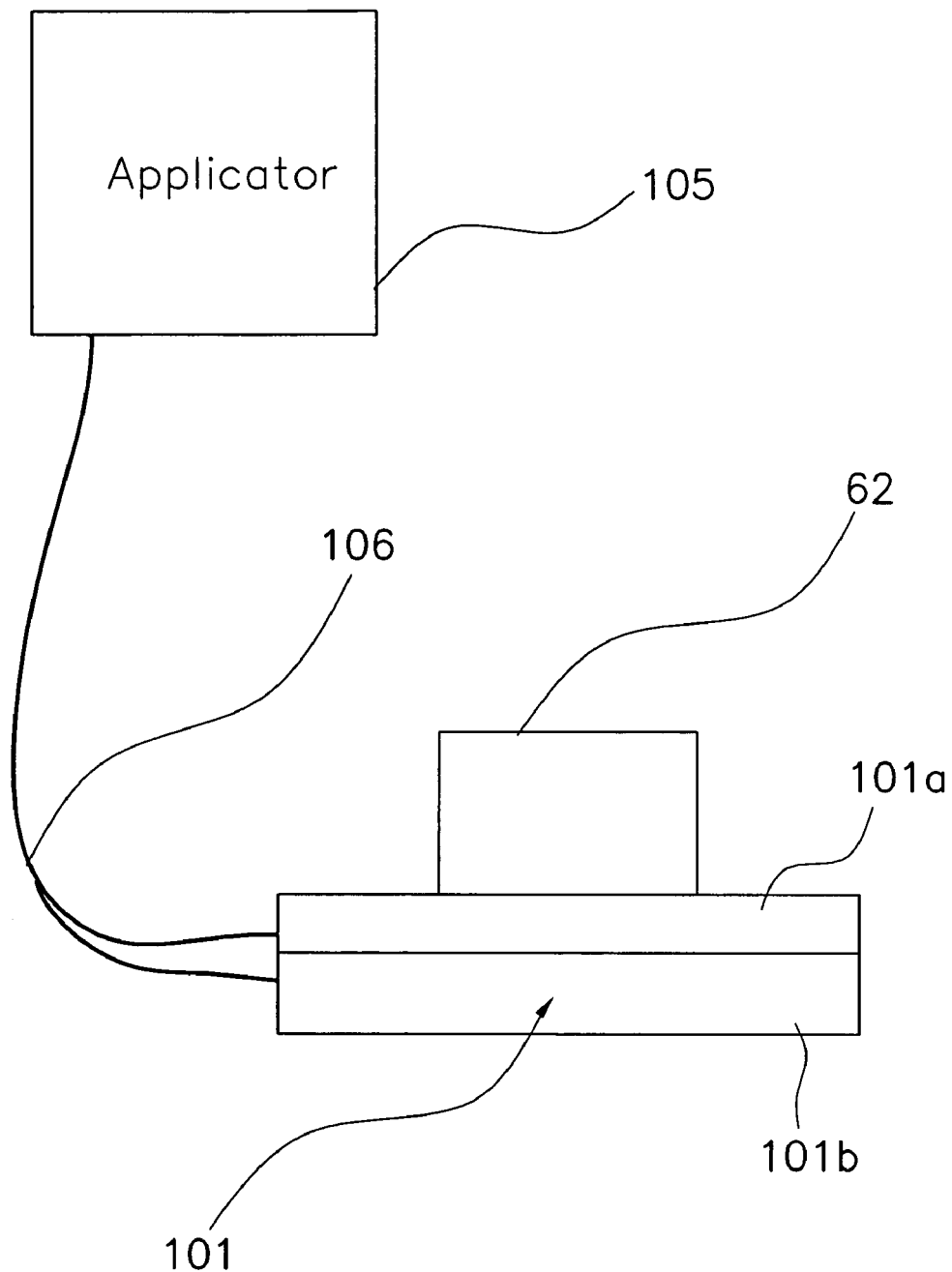
FIG. 13 is a schematic diagram of a hot melt processing device which is used to manufacture the spool brake mechanism in accordance with the embodiment of the present invention.

As shown in FIG. 13, a hot melt processing device will be used when the molded insulating coating film 90 is to be formed with the hot melt molding process. In the hot melt processing device, a hot melt sealant made from, for example, a plastic polyamide resin (resin raw material) is melted, and the sealant is supplied to the mold 101 at a low temperature and a low pressure via a hose 106.

As shown in FIG. 14, the mold 101 is donut shaped, and includes an upper mold 101a and a lower mold 101b. The mold 101 includes a molding space in between the upper mold 101a and the lower mold 101b, in which the circuit board 70 on which electronic components such as the microcomputer 59 are mounted is positioned. The mold 101 has a molding space 102 in between the upper and lower molds 101a and 101b, such that circuit board 70 with various electronic components attached thereto can be positioned within the molding space 102, and that the molded insulating coating film 90 can be formed between the circuit board 70 and the electronic components. Here, there is no gap formed between the circuit board 70 and the electronic components in regions 95 on which the head portions 92a of the screws 92 of the control board 70 are to be disposed, so that the molding insulating coating film 90 will not be formed on the regions 95. Because an insulating coating film is already formed on the coils 62, the molded insulating coating film 90 will not be formed thereon in this molding process. In addition, the coil holder 69 is used in order to seal the positioning and the gaps of the mold 101. Furthermore, a plurality of projections 101c that contact with the light emitting portions and receptor portions are provided on the mold 101, so as to surround the light emitting portions and receptor portions of the electro-optical sensor 44 and the electro-optical sensors 56*a*, 56*b* with tubular spaces which are open at the tops thereof. Moreover, a large recessed portion is formed so as to include the peripheries of the electrical components such as the light emitting portion 44*a* and receptor 44*b* of the electro-optical sensor 44, the two electro-optical sensors 56*a*, 56*b*, the microcomputer 59, and the switch element 63, so that these elements are covered together by the molded insulating coating film 90. The first to third regions 97*a*–97*c* on the front surface and the first and second regions 98*a*, 98*b* on the rear surface are formed in the recessed portion. This allows the shape of the mold 101 to be simplified and molding costs to be reduced.

Figure 15:
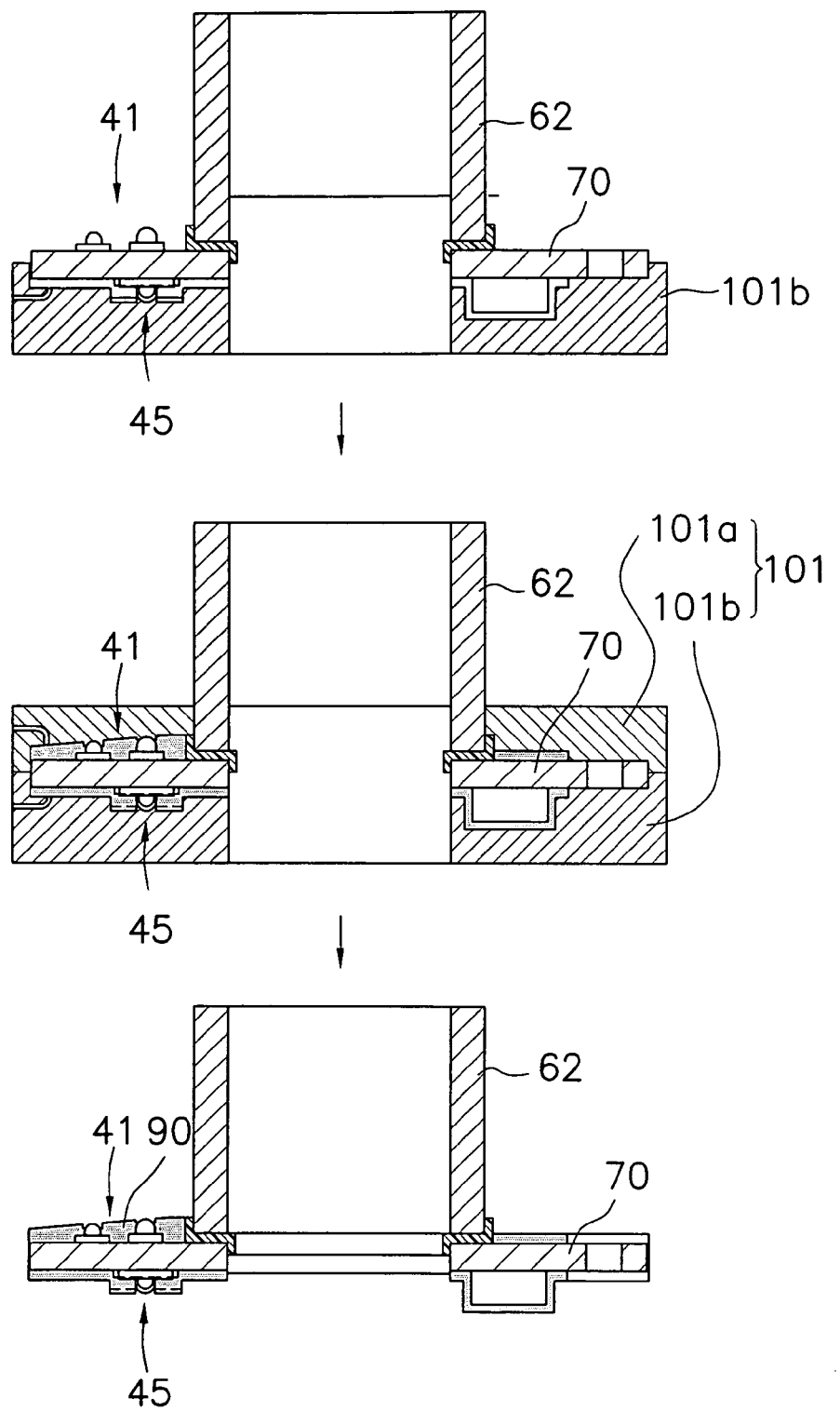
FIG. 15 is a figure showing the steps in a hot melt process to manufacture the spool brake mechanism in accordance with the embodiment of the present invention.

As shown in FIG. 15, when the molded insulating coating film 90 is to be formed, the circuit board 70 having the electronic components and the coils 62 that are mounted on the circuit board 70 is positioned and set in the lower mold 101*b*. Then, the upper mold 101*a* is mounted on the lower mold 101*b*, such that the circuit board 70 is clamped. In this state, a melted hot melt sealant is supplied to the upper and lower molds 101*a*, 101*b* at, for example, a low temperature of between 140 and 200 degrees centigrade and a low pressure of 2 to 5 MPa from the applicator 105 of the hot melt processing device via the hose 106. As a result, the hot melt sealant will be supplied to the gaps between the upper and lower molds 101*a*, 101*b* and the circuit board 70 and the electrical components. Then, when the hot melt sealant is cooled, the circuit board 70 is removed from the mold 101. At this time, the molded insulating coating film 90 will be formed on both surfaces of the circuit board 70. In addition, the regions 95 in which the head portions 92*a* of the screws 92 are to be disposed, the regions 97 in which the light emitting portions and the receptor portions of the electro-optical sensors 44, 56*a*, 56*b* are to be disposed, and the regions in which the external device connector 96 are to be disposed, are masked by the mold 101, so that the molding insulating coating film 90 is not formed there.

After the molded insulating coating film 90 is formed, the electronic circuit will be inspected with the molded insulating coating film 90 formed thereon. When conducting an inspection, four pins of an inspection device are connected to each terminal 96*a*–96*d* of the external device connector 96. The results of the measurements are checked to determine whether or not they have the desired values. The circuit inspection and the inspection of the insulation are performed simultaneously. When the inspection is completed, additional insulating coating film is formed on the external device connector 96 by a hot melt spray process.

By covering each unit on the circuit board 70 in this manner with an insulating coating film 90 made of an insulating material, liquids can be prevented from entering the electrical components such as the microcomputer 59. Moreover, in this embodiment, it will be unnecessary to replace the electric power source because the electrical power that is generated will be stored in the condenser element 57 and this electrical power will be used to operate the controller 55 and the like. Because of this, the sealing of the insulating coating film 90 can be made permanent, and problems caused by bad insulation can be further reduced.

Operation and Function of the Reel During Actual Fishing

When casting, the clutch lever 17 is pressed down to place the clutch mechanism 21 in the clutch off position. In this clutch off state, the spool 12 can rotate freely, and the fishing line will unwind from the spool 12 at a full speed during casting due to the weight of the tackle. When the spool 12 rotates due to casting, the magnets 61 rotate around inside the inner peripheral sides of the coils 62, and if the switch element 63 is on, an electric current will flow through the coils 62, and the spool 12 will be braked. During casting, the rotational speed of the spool 12 will gradually become faster, and will be gradually reduced if a peak is exceeded.

Here, even if the magnets 61 are disposed near the bearing 26*b*, it will be difficult for the bearing 26*b* to become magnetized because the magnetic washer member 66 is disposed between the magnets 61 and the bearing 26*b* and because there is a gap of 2.5 mm or greater between the magnets 61 and the bearing 26*b*. Thus, the ability of the spool 12 to rotate freely will improve. In addition, it will be difficult for cogging to occur and the ability of the spool 12 to freely rotate will improve even more because the coils 62 are coreless coils.

When the tackle lands in the water, the clutch mechanism 21 will be placed in the clutch on state by rotating the handle 2 in the line winding direction and by the clutch return mechanism (not shown in the figures). Then, the reel unit 1 will be palmed to await a bite from a fish.

In addition, in the event that the spool brake mechanism 25 is to be exchanged with another mechanism, the first cover 6 will be removed to expose the spool support portion 13 to the exterior. Then, the spool support portion 13 that is screwed to the periphery of the opening 8*a* will be removed from the side plate 8. This allows the spool brake mechanism 25 to be removed from the reel unit 1 together with the spool support portion 13. Then, another spool support portion on which another spool brake mechanism having different braking characteristics is mounted will be mounted on the side plate 8 on the periphery of the opening 8*a*. This spool brake mechanism will use the same rotor 60 mounted on the spool shaft 20 that was previously used by the spool brake mechanism 25. In addition, the different spool brake mechanism has a color that is different from the standard color of the knob unit 73, and thus one can easily recognize from the exterior that this spool brake mechanism has different braking characteristics.

Control Operation of the Controller

Figure 9:
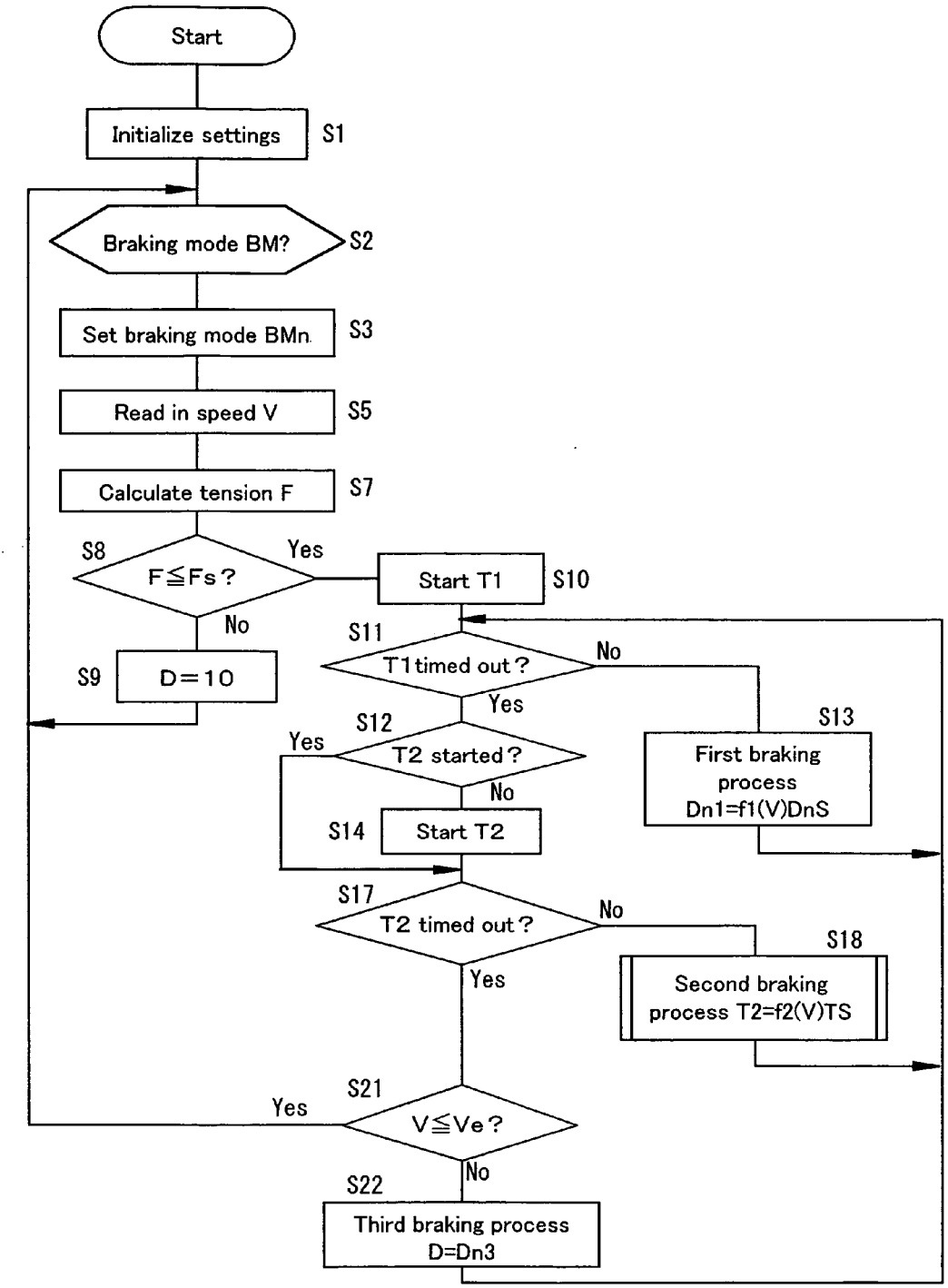
FIG. 9 is a flowchart showing a primary braking process of a controller of the spool brake mechanism in the dual bearing reel in accordance with the embodiment of the present invention.

Next, the brake control operation performed by the controller 55 during casting will be described with reference to the control flowcharts of FIGS. 9 and 10 and the graphs in FIGS. 11A, 11B, and 12.

Initialization occurs at Step S1 when the spool 12 rotates due to casting, the condenser element 57 starts storing electric power, and an electric power starts being supplied to the controller 55. Here, various flags and variables are reset. In Step S2, it is determined whether or not a braking mode BMn has been selected by the brake switch knob 43 (n is an integer between 1 and 8). At Step S3, the braking mode that was selected is set as the braking mode BMn. When this occurs, a duty ratio D that corresponds to the braking mode BMn will be read out from the ROM inside the controller 55. At Step S5, a rotational speed V of the spool 12 at the time the casting begins is detected through pulses from the rotational speed sensor 41. At Step S7, tension F applied to the fishing line released from the spool 12 is computed.

Here, the tension F can be determined from the rate of change of the rotational speed of the spool 12 ($\Delta\omega/\Delta t$) and the moment of inertia J of the spool 12. When the rotational speed of the spool 12 changes at a certain point, the difference between the rotational speed of the spool 12 at the time of rate change and the rotational speed when the spool 12 freely and independently rotates without receiving tension from the fishing line is due to rotational drive force (torque) generated by the tension from the fishing line. If we assume that the rate of change of the rotational speed at this time is (Δω/Δt), then the drive torque T can be expressed as equation (1) below.

$$T = J \times (\Delta\omega/\Delta t). \quad (1)$$

If the drive torque T is determined from the equation (1), the tension from the radius of the point of application of the fishing line (normally 15 to 20 mm) can be determined. It is known that if a large braking force is applied when this tension is at or below a predetermined value, the attitude of the tackle (lure) will reverse and stabilize just before the rotational speed reaches the peak rotational speed of the spool 12 and the tackle will fly. The following control is carried out in order to brake the spool 12 just before its peak rotational speed and make the tackle fly with a stable attitude. In other words, a strong braking force will be applied to the spool 12 for a short period of time at the beginning of casting to make the tackle reverse, and after this the spool 12 will be braked with a braking force that gradually weakens to a constant amount during casting. Finally, the spool 12 will be braked with a braking force that gradually weakens until the number of rotations of the spool 12 falls below a predetermined value. The controller 55 will carry out these three braking processes.

In Step S8, it is determined whether or not the tension F computed by the rate of change of the rotational speed (Δω/Δt) and the moment of inertia J is at or below a predetermined value Fs (for example, a value in a range between 0.5N and 1.5N). If the tension F exceeds the predetermined value Fs, then the process moves to Step S9, where the duty ratio D is set to 10 (i.e., the switch element 63 is turned on for only 10% of a cycle), and the process returns to Step S2. When this occurs, the spool brake unit 40 slightly brakes the spool 12. The spool control unit 42 will stably operate because the spool brake unit 40 generates electricity.

If the tension F is at or below the predetermined value Fs, then the process moves to Step S10. In Step S10, where a timer for measuring a time period T1 (herein after referred to as timer T1) is started. This timer T1 determines the length of time during which a first braking process will be applied that brakes the spool 12 with a strong braking force. At Step S11, it will be determined whether or not the timer T1 has timed out. If the timer T1 has not timed out, then the process moves to Step S13 and the first braking process is carried out during casting until the timer T1 times out. As shown by the hatching in the lower left portion of FIG. 11A, this first braking process brakes the spool 12 with a fixed first duty ratio Dn1 for only the time period T1. This first duty ratio Dn1 is for example 50 to 100% duty (the switch element 63 is on for 50% to 100% of the entire cycle), and preferably in a range between 70 to 90% duty, and changes depending upon the rotational speed V detected at Step S5. In other words, the first duty ratio Dn1 is a value that is computed by multiplying a function f1 (V) of the spool rotational speed V at the beginning of casting by a duty ratio DnS that is predetermined in accordance with the braking mode. In addition, the time period T1 is preferably in a range of between 0.1 to 0.3 seconds. When braking occurs within this time range, it will be easier to brake the spool 12 before the spool 12 reaches its peak rotational speed.

The first duty ratio Dn1 is shifted up or down depending upon the braking mode BMn. In this embodiment, when the braking mode is at the highest value (n=1), a duty ratio D11 will be the maximum and will gradually decrease from this point. When a strong braking force is applied for a short period of time as described above, the attitude of the tackle will reverse from its fishing line engagement portion, and the tackle will fly with the fishing line engagement portion being in front. When this occurs, the attitude of the tackle will be stable, and thus the tackle will fly further.

On the other hand, when the timer T1 times out in Step S11, the process moves from Step S11 to Step S12. At Step S12, it will be determined whether or not a timer for measuring a time period T2 (hereinafter referred to as timer T2) has already started. If the timer T2 has started, then the process moves to Step S17. If the timer T2 has not started, then the process moves to Step S14 and the timer T2 is started. The timer T2 determines the length of time during which a second braking process will be carried out.

At Step S17, it will be determined whether or not the timer T2 has timed out. If the timer T2 has not timed out, then the process moves to Step S18 and the second braking process is carried out until the timer T2 times out. As shown by the hatching indicated as T2 in the lower portion of FIG. 11A, the second braking process brakes the spool 12 during a second predetermined time period T2 at a duty ratio Dn2 that changes by rapidly dropping at first, then gradually dropping, and finally remaining at a constant value. The minimum value of the duty ratio Dn2 is preferably in a range of between, for example, 30 and 70%. In addition, the second predetermined time period T2 is preferably between 0.3 to 2 seconds. Like the first duty ratio Dn1, the second predetermined time period T2 also changes according to the spool rotational speed V at the beginning of casting. For example, the second predetermined time period T2 is calculated by multiplying a function f2(V) of the spool rotational speed V at the beginning of casting with a predetermined time period TS.

Figure 10:
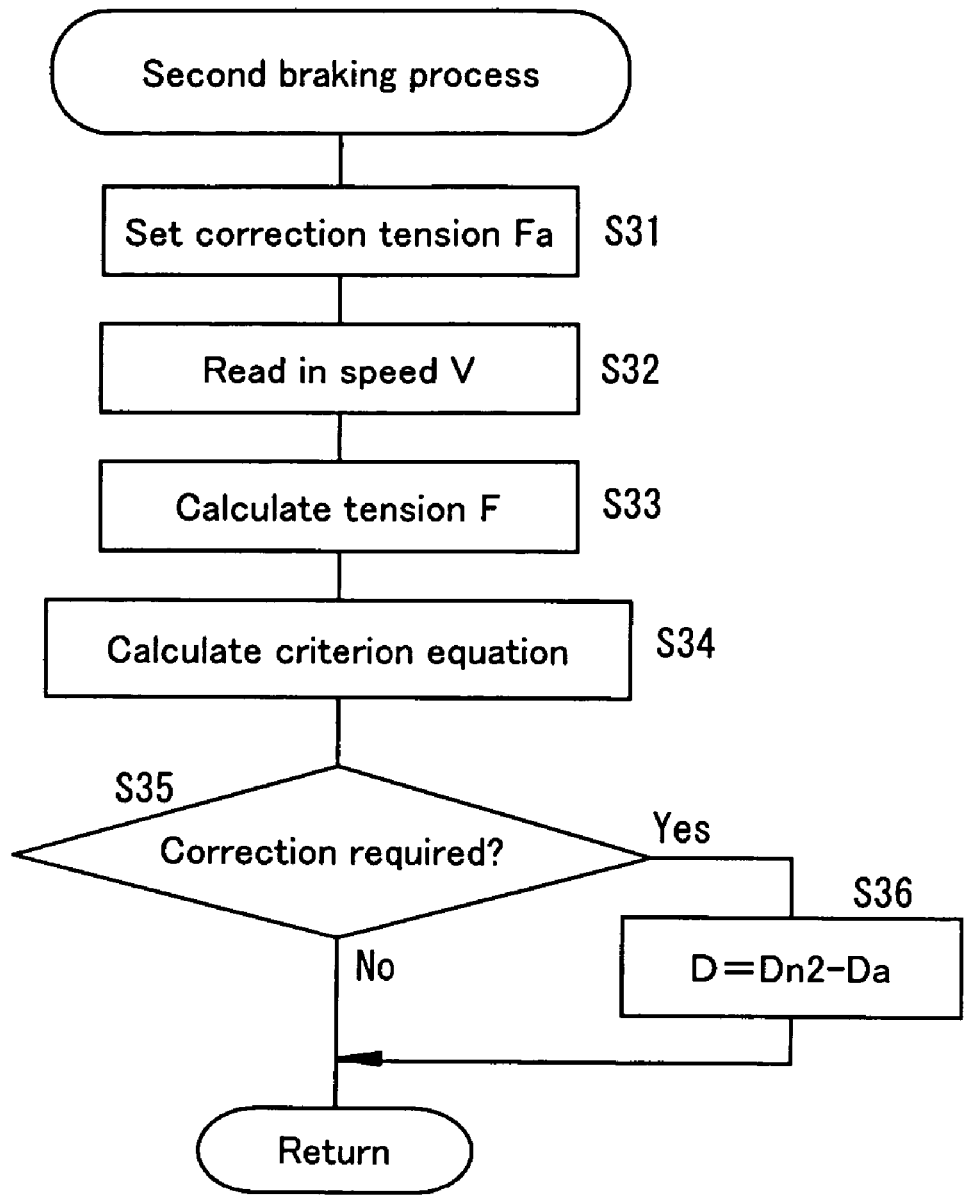
FIG. 10 is a flowchart showing a second braking process of the spool brake mechanism in the dual bearing reel in accordance with the embodiment of the present invention.

In addition, a brake correction process like that shown in FIG. 10 is carried out in the second braking process and a third braking process for the purpose of cutting extraneous braking force. In Step S31 of FIG. 10, a correction tension Fa is set. The correction tension Fa is a fluction of time and is expressed as shown by the dotted and dashed lines in FIG. 12. The correction tension Fa is set such that it gradually declines over time. Note that in FIG. 12, a graph of the correction process in the third braking process is illustrated.

The speed V is read in at Step S32. At Step S33, the tension F is computed in the same manner as in Step S7. At Step S34, a criterion expressed by the following equation (2) is computed from the tension obtained in Step S33. At Step S35, it is determined whether or not brake correction is needed from the criterion.

$$C = SSa \times (F - SSd \times \text{rotational speed}) - (\Delta F/\Delta t). \quad (2)$$

Here, SSa, SSd are coefficients with respect to the rotational speed (rpm), which is for example 50. In addition, SSd is 0.000005.

When the results of equation (2) are positive, in other words when it is determined that the computed value of the tension F exceeds the set tension Fa by a large amount, then it is determined in Step S35 that the answer is "Yes", and the process moves to Step S36. At Step S36, the second duty ratio Dn2 that was set in advance will be corrected by subtracting a fixed amount Da therefrom by the next sampling cycle (normally each rotation).

At Step S21, it is determined whether or not the speed V is at or below a brake completion speed Ve. If the speed V exceeds the brake completion speed Ve, then the process moves to Step S22. The third braking process is carried out at Step S22.

Figure 11A:
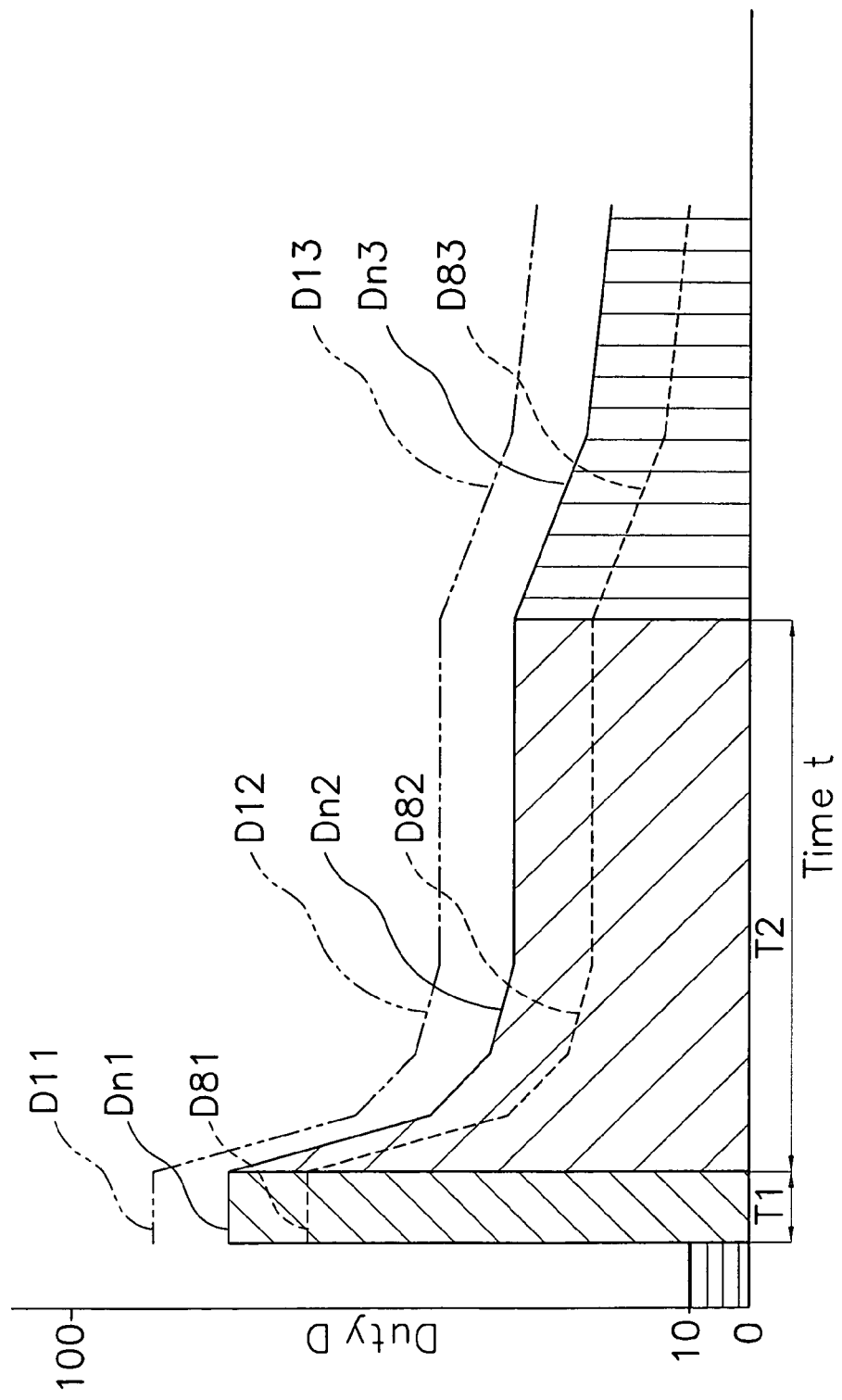
FIG. 11A is a graph schematically showing the changes in duty ratio with each braking process of a standard spool brake mechanism in the dual bearing reel in accordance with the embodiment of the present invention.
Figure 12:
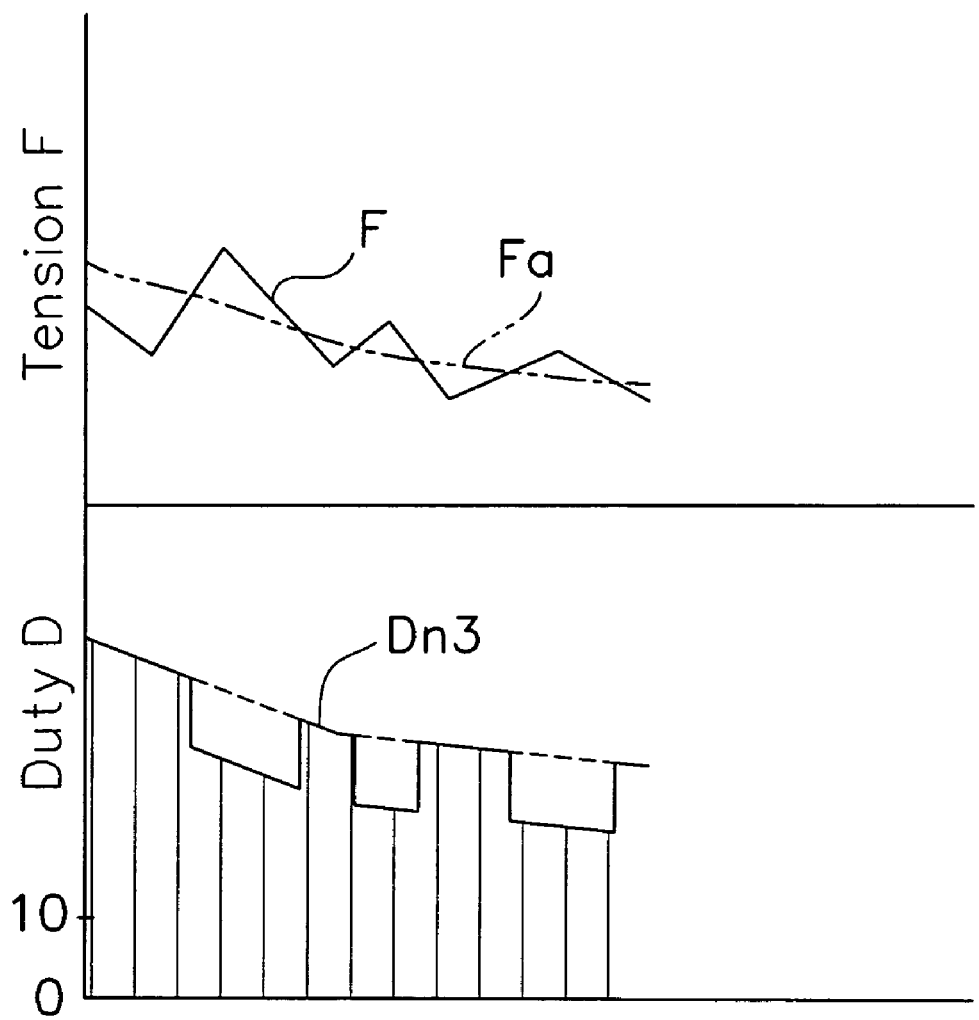
FIG. 12 are graphs which schematically show an auxiliary process of a third braking process of the spool brake mechanism in the dual bearing reel in accordance with the embodiment of the present invention.

As shown by the vertical hatching in FIG. 11A, the third braking process brakes the spool 12 with a duty ratio Dn3 that changes over time like the second braking process and, in which the rate of reduction gradually becomes smaller. Then, the process returns to Step S11. The process continues Steps S11–S21 until the speed V is at or smaller than the brake completion speed Ve at Step S21. The brake correction process is also executed in the third braking process.

If the speed V is at or below the brake completion speed Ve at Step S21, then the process returns to Step S2.

Here, if the spool 12 is braked with a strong braking force before the rotational speed of the spool 12 reaches its peak, tension that was at or below the first predetermined value Fs will be rapidly increased, backlash will be prevented, and the tackle will fly in a stable manner. Because of this, backlash can be prevented, the attitude of the tackle can be stabilized, and the tackle can be cast out further.

In addition, because the spool is controlled in three braking processes with different duty ratios and braking times in accordance with the rotational speed of the spool at the beginning of casting, the spool will be braked with duty ratios and braking times that differ depending upon the rotational speed of the spool, even when the settings are the same. Because of this, it will be unnecessary to manually adjust the braking force even if casting is performed with different spool rotational speeds, and thus the burden on the fisherman can be reduced.

Figure 11B:
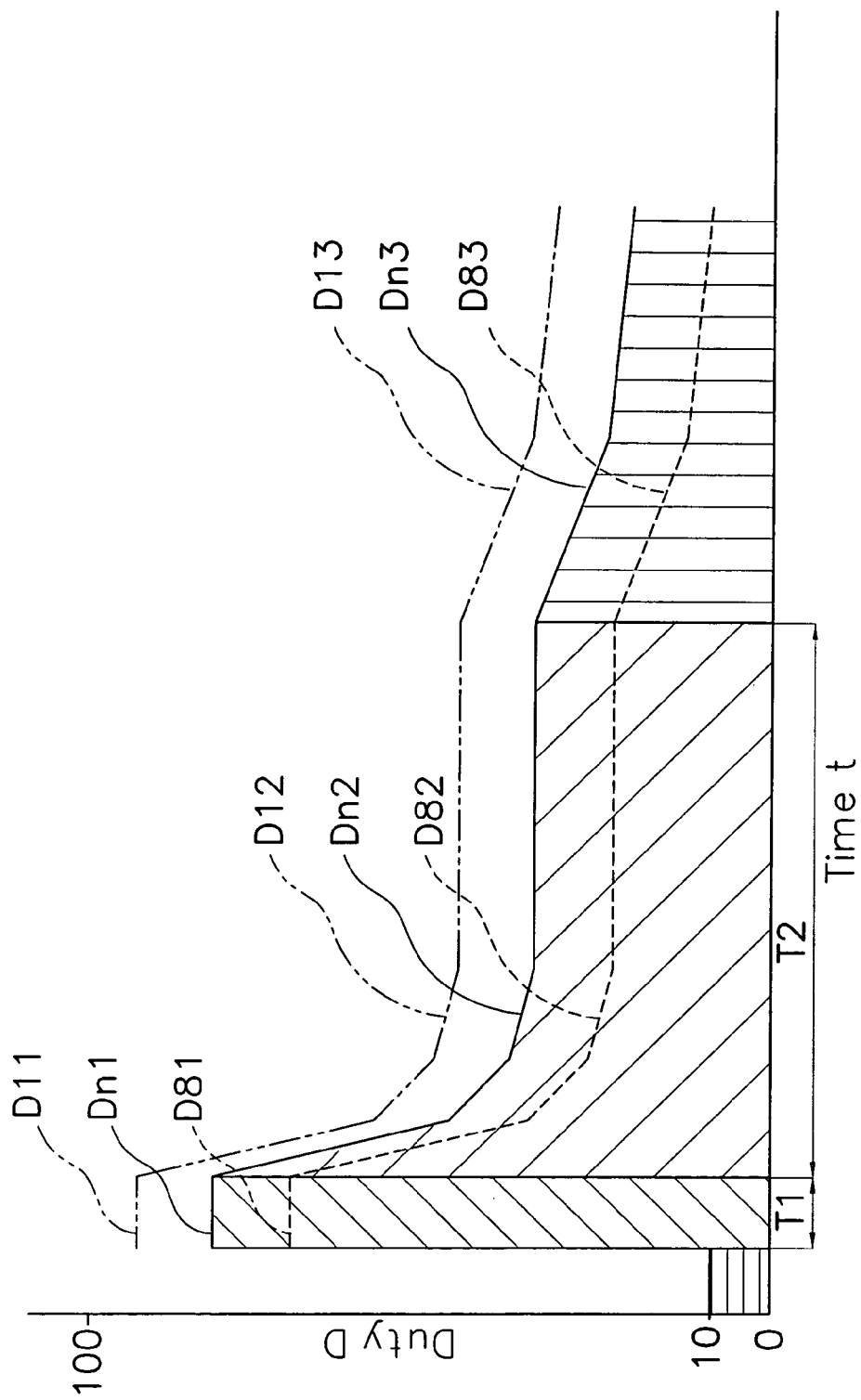
FIG. 11B is a graph schematically showing the changes in duty ratio with each braking process of a spool brake mechanism having different brake characteristics.

In addition, when another brake mechanism that has different braking characteristics is used, the braking operation can be performed as shown in FIG. 11B. This spool brake mechanism has braking characteristics in which the braking force during the time period T1 is larger than that in the standard spool brake mechanism shown in FIG. 11A, although other braking characteristics are the same. This other spool brake mechanism, for example, is used with fishing line such as one made of fluorocarbons, that has a density larger than that of standard nylon fishing line if they are of the same type of fishing line. Thus, if a heavy fishing line is used, it will be generally necessary to operate the knob unit 73 and increase the braking force. However, if the braking force is increased, the braking force will have to be set very strong, and thus the flying distance of the tackle may be harmed after the initial rise. In order to prevent this problem, the spool brake mechanism will be exchanged with one in which only the first braking force can be made large during the time period T1.

Figure 16:
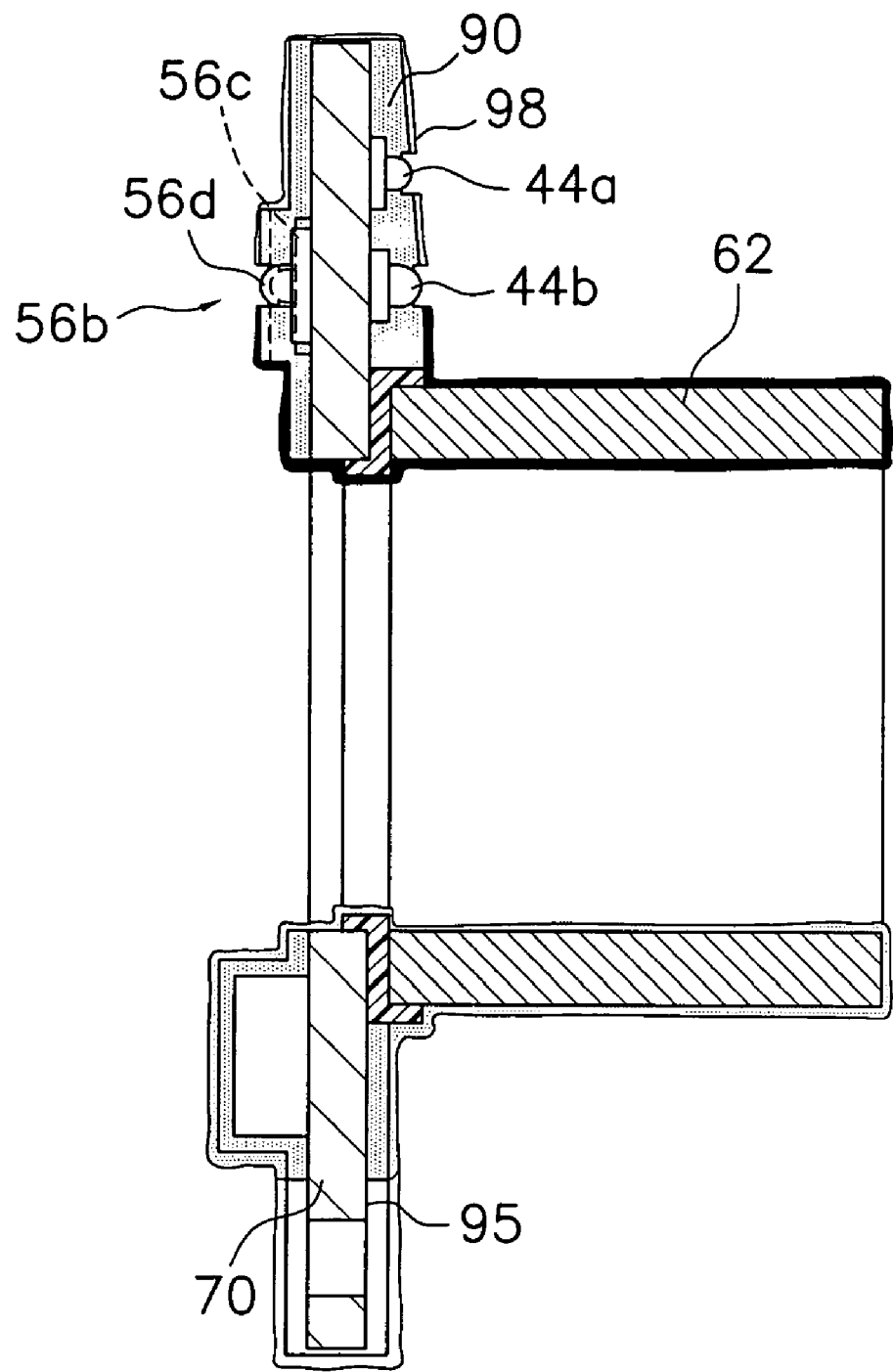
FIG. 16 is a partial enlarged cross-sectional view of the spool brake mechanism dual bearing reel in accordance with another embodiment of the present invention.

Other Embodiments (a) In the aforementioned embodiment, an insulating coating film is simply additionally formed on the external connector 96 by the hot melt spray process after the first molded insulating coating film is formed. However, as shown in FIG. 16, a non-molded insulating coating film 98 may be formed on the surface of the molded insulating coating film 90 by an immersion process. The non-molded insulating coating film 98 is formed as described below. When the inspection of the circuit is completed, the regions 95 in which the head portions 92a of the screws 92 are disposed, and the light emitting portions of the lights 44a, 56c and the receptor portions of the receptors 44b, 56d of the electro-optical sensor 44, 56a, 56b are masked with tape or by printing. Then, the masked circuit board 70 is immersed in a tank which contains a liquid synthetic resin, and the masked circuit board 70 is then removed from the tank and subjected to a hardening process in order to form the non-molded insulating coating film 98 on the surface.

Thus, the insulating performance can be further improved by forming the non-molded insulating coating film 98 on a surface on which the molded insulating coating film 90 was formed and/or on a surface on which the molded insulating coating film 90 was not formed.

(b) In the aforementioned embodiment, the only braking characteristic that will change when the spool brake mechanism is replaced with another spool brake mechanism is the braking force during the time period T1. However, it is also possible to change the length of the time periods T1 or T2, or change at least one level of braking force during the time period T2, or shift the entire braking force upward or downward.

(c) In the aforementioned embodiment, a dual bearing reel having spool brake mechanisms with the same form but different braking characteristics was described as an example. However, the present invention can be applied to, for example, a dual bearing reel in which a centrifugal braking device and a magnetic braking device having different braking characteristics can be exchanged for one another. In this situation as well, a device identification portion that makes the spool brake mechanism visible from the exterior can be provided on the spool braking devices.

(d) In the aforementioned embodiment, the device identification portion is embodied as the color of the knob unit 73. However, the device identification portion of the present invention is not limited thereto, and may be any structure or method that allows one to confirm the type of the spool braking device from the exterior when mounted on the reel unit. For example, the device identification portion may be the color or shape of the spool that indicates different braking characteristics and is visible when the spool is to be exchanged.

According to the present invention, the braking characteristics of the spool braking device can be easily confirmed because it is possible to easily identify the braking characteristic of a spool braking device when the spool braking device is exchanged with another spool braking device having different braking characteristics.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus-function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2004-025915. The entire disclosure of Japanese Patent Application No. 2004-025915 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spool braking device adapted to be exchangeably mounted in a dual bearing reel, the spool braking device being adapted to brake rotation of a spool and comprising:
   a spool braking portion that is adapted to brake the spool according to a predetermined braking characteristic and configured to assume one of a plurality of braking patterns;
   a spool control portion that is operatively coupled to the spool braking portion and configured to control the spool braking portion; and
   a device identification portion that indicates the predetermined braking characteristic, the device identification portion including a color of a portion that is visible by an exterior appearance in a state of attaching to a reel.

2. A spool braking device adapted to be exchangeably mounted in a dual bearing reel, the spool braking device being adapted to brake rotation of a spool and comprising:
   a spool braking portion that is adapted to brake the spool according to a predetermined braking characteristic;
   a spool control portion that is operatively coupled to the spool braking portion and configured to control the spool braking portion; and
   a device identification portion that indicates the predetermined braking characteristic, the spool braking portion including
      a rotor that is arranged in a rotational direction of the spool, the rotor including
         a plurality of magnetic poles whose polarities are sequentially different,
      a plurality of serially connected coils that are arranged around the circumference of the rotor, and
      a switch connected to both ends of the plurality of serially connected coils, the spool control portion including a circuit board on which the plurality of coils are mounted.

3. The spool braking device set forth in claim 2, wherein the circuit board includes a program according to which the predetermined braking characteristic is determined.

4. A dual bearing reel adapted to be mounted on a fishing rod, comprising:
   a reel unit having a handle and adapted to be mounted on the fishing rod;
   a spool in which a fishing line is adapted to be mounted, the spool being rotatably mounted on the reel unit so as to be rotatable by the handle;
   a first spool braking device mounted on the reel unit so as to be at least partially exchangeable, the first spool braking device having
      a first spool braking portion that is adapted to brake the spool according to a first predetermined braking characteristic, and
      a first device identification portion that indicates the first predetermined braking characteristic; and
   a second spool braking device mounted on the reel unit so as to be at least partially exchangeable with the first spool braking device, the second spool braking device having
      a second spool braking portion that is adapted to brake the spool according to
         a second predetermined braking characteristic, and
      a second device identification portion that indicates the second predetermined braking characteristic.

5. The dual bearing reel set forth in claim 4, wherein the first spool braking device includes a first spool control portion that is operatively coupled to the first spool braking portion and configured to electrically control the first spool braking portion.

6. The dual bearing reel set forth in claim 5, wherein the first spool control portion is configured to set a braking force with which the first spool braking portion brakes the spool in accordance with a type of the fishing line mounted on the spool.

7. The dual bearing reel set forth in claim 4, wherein
   the first spool braking portion is configured to assume one of a plurality of braking patterns,
   the first spool braking device further includes a first indicator portion which allows a user to select one of the plurality of braking patterns, and
   the first identification portion includes a color of a surface of the first indicator portion.

8. The dual bearing reel set forth in claim 4, wherein the first and second spool braking devices are of a same type.

9. A dual bearing reel adapted to be mounted on a fishing rod, comprising:
   a reel unit having a handle and adapted to be mounted on the fishing rod;
   a spool in which a fishing line is adapted to be mounted, the spool being rotatably mounted on the reel unit so as to be rotatable by the handle;
   a first spool braking device mounted on the reel unit so as to be at least partially exchangeable, the first spool braking device having
      a first spool control portion that is operatively coupled to the first spool
         braking portion and configured to electrically control the first spool braking portion,
      a first spool braking portion that is adapted to brake the spool according to a first predetermined braking characteristic, and
      a first device identification portion that indicates the first predetermined braking characteristic,
   the first spool braking portion including
      a rotor arranged in a rotational direction of the spool, the rotor including a plurality of magnetic poles whose polarities are sequentially different and rotates in association with the spool,
      a plurality of serially connected coils are disposed spaced apart from the rotor, and
      a switch connected to both ends of the plurality of serially connected coils, and the first spool control portion including a circuit board on which the plurality of coils are mounted.

10. The dual bearing reel set forth in claim 9, wherein the circuit board includes a program according to which the predetermined braking characteristic is determined.

* * * * *